US012585802B2

(12) United States Patent
Kumagai

(10) Patent No.: US 12,585,802 B2
(45) Date of Patent: Mar. 24, 2026

(54) SYSTEM AND METHOD FOR UPDATING ACCESS TOKENS IN AN INFORMATION PROCESSING APPARATUS

(71) Applicant: CANON KABUSHIKI KAISHA, Tokyo (JP)

(72) Inventor: Takekazu Kumagai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 18/753,260

(22) Filed: Jun. 25, 2024

(65) Prior Publication Data

US 2025/0005180 A1     Jan. 2, 2025

(30) Foreign Application Priority Data

Jun. 30, 2023     (JP) ................................. 2023-108517

(51) Int. Cl.
*G06F 21/62*          (2013.01)
*H04L 9/32*           (2006.01)

(52) U.S. Cl.
CPC ............ *G06F 21/62* (2013.01); *H04L 9/3213* (2013.01); *G06F 2221/2141* (2013.01)

(58) Field of Classification Search
CPC . G06F 21/62; G06F 2221/2141; H04L 9/3213
USPC .......................................................... 726/27
See application file for complete search history.

(56) References Cited

U.S. PATENT DOCUMENTS

| 9,244,675 B2 * | 1/2016 | Tsuji ...................... G06F 1/3284 |
| 2009/0235102 A1 * | 9/2009 | Koshika ................ G06F 1/3203 |
| | | 711/163 |

| 2009/0296934 A1 * | 12/2009 | Qing .................... H04W 12/041 |
| | | 380/277 |
| 2010/0161819 A1 * | 6/2010 | Ohara .................... G06F 3/1221 |
| | | 709/229 |
| 2010/0235500 A1 * | 9/2010 | Shizuno .................. H04L 12/12 |
| | | 709/224 |
| 2015/0103375 A1 * | 4/2015 | Mihira .................. G06F 3/1221 |
| | | 358/1.15 |
| 2015/0153981 A1 * | 6/2015 | Iwasaki .............. H04N 1/00344 |
| | | 358/1.14 |
| 2015/0236908 A1 * | 8/2015 | Kim .................... H04L 12/2825 |
| | | 709/221 |

(Continued)

FOREIGN PATENT DOCUMENTS

| JP | 2017027459 A | 2/2017 |

*Primary Examiner* — Thanh T Le

(74) *Attorney, Agent, or Firm* — Canon U.S.A., Inc., IP Division

(57)          ABSTRACT

An information processing apparatus is provided. The information processing apparatus has a power-saving function for changing a mode of the information processing apparatus from a normal mode to a power-saving mode in which a power consumption amount is smaller. When a predetermined condition is satisfied, the apparatus obtains an access token and an expiration time of the access token from the authorization server, stores an expiration time of an obtained access token and the access token in association with each other, and returns, if the information processing apparatus is in the power-saving mode, to the normal mode and updating at least some of obtained and stored access tokens when an expiration time of at least one access token out of the obtained and stored access tokens is reached.

10 Claims, 19 Drawing Sheets

(56)     References Cited

U.S. PATENT DOCUMENTS

| | | | |
|---|---|---|---|
| 2018/0262492 A1* | 9/2018 | Daniel | H04N 1/00103 |
| 2021/0044587 A1* | 2/2021 | Otsuka | H04L 63/0892 |
| 2021/0105263 A1* | 4/2021 | Suzuki | H04L 63/0853 |
| 2025/0007901 A1* | 1/2025 | Bourne | H04W 4/70 |

* cited by examiner

F I G.  1
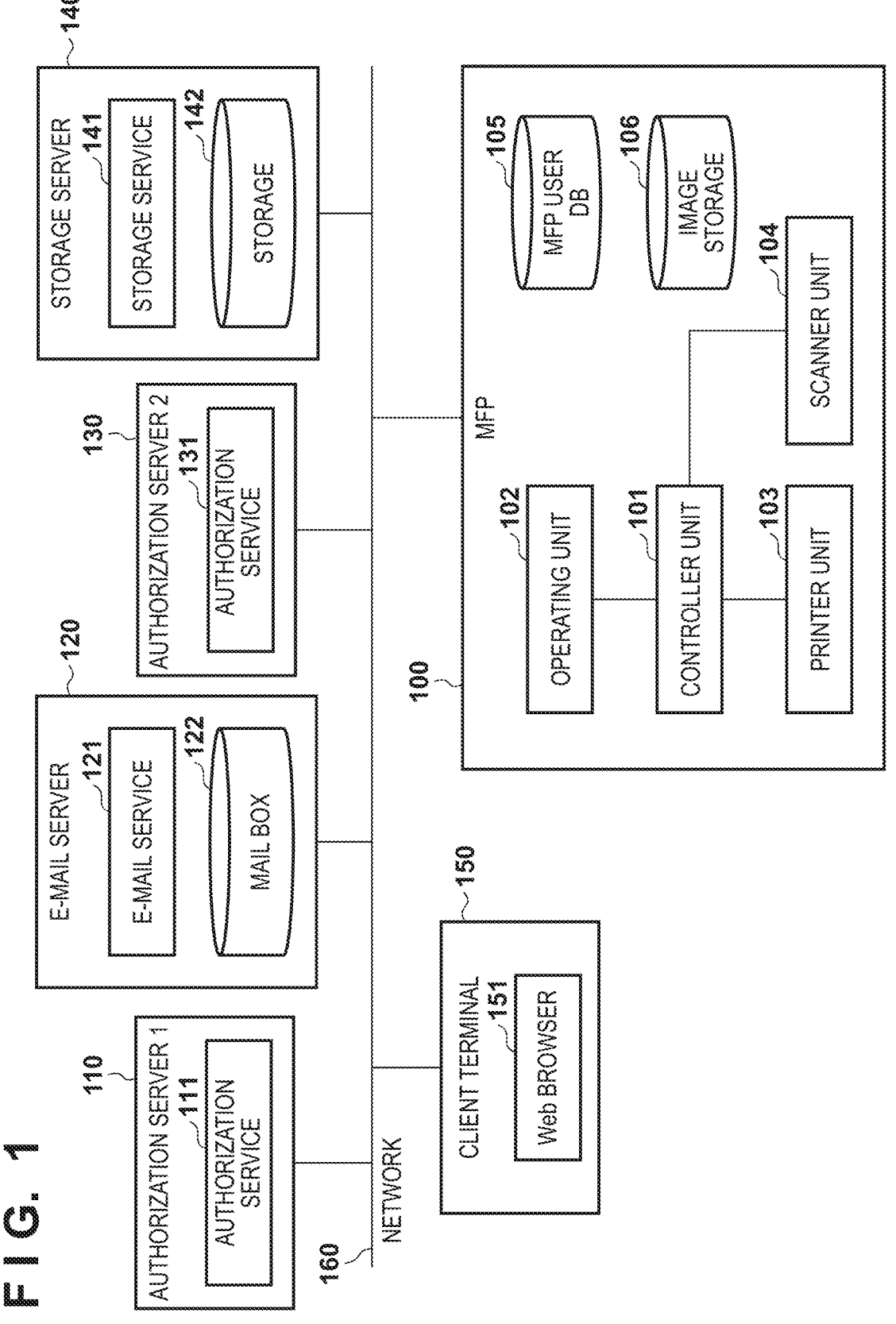

FIG. 2

F I G. 3
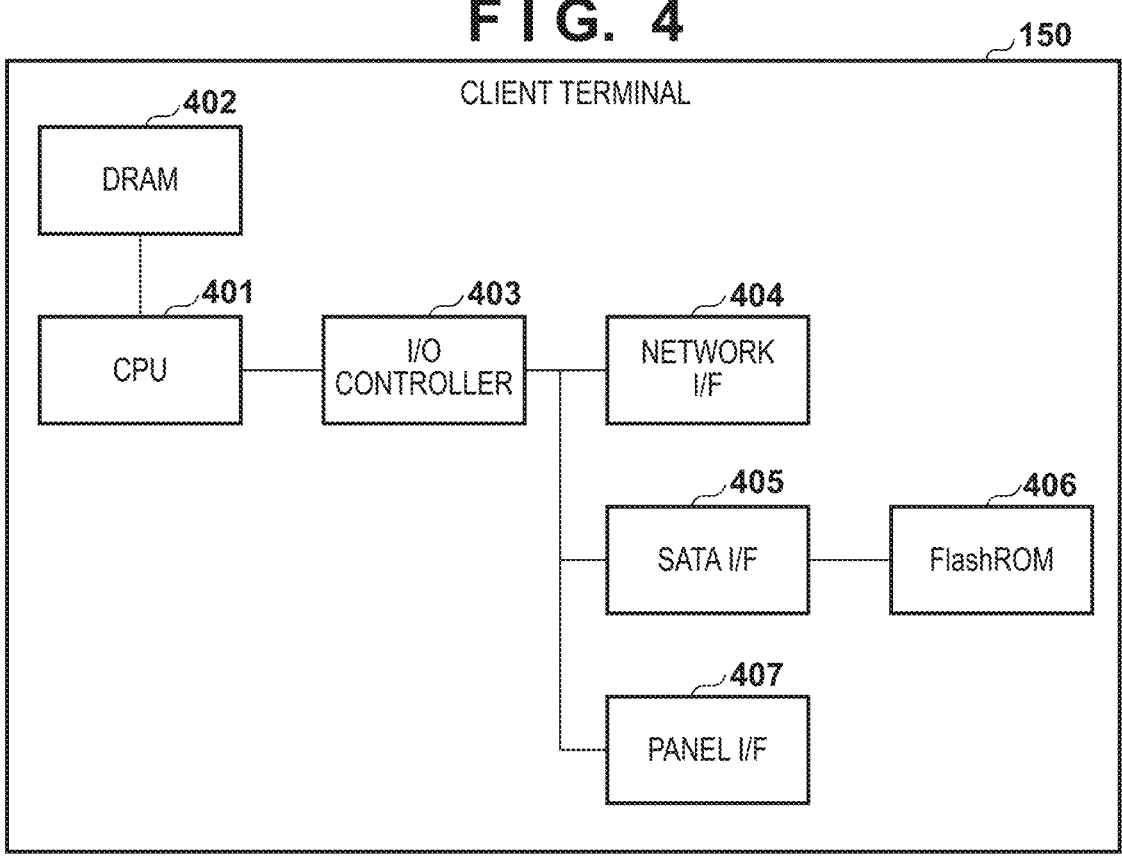

F I G. 5
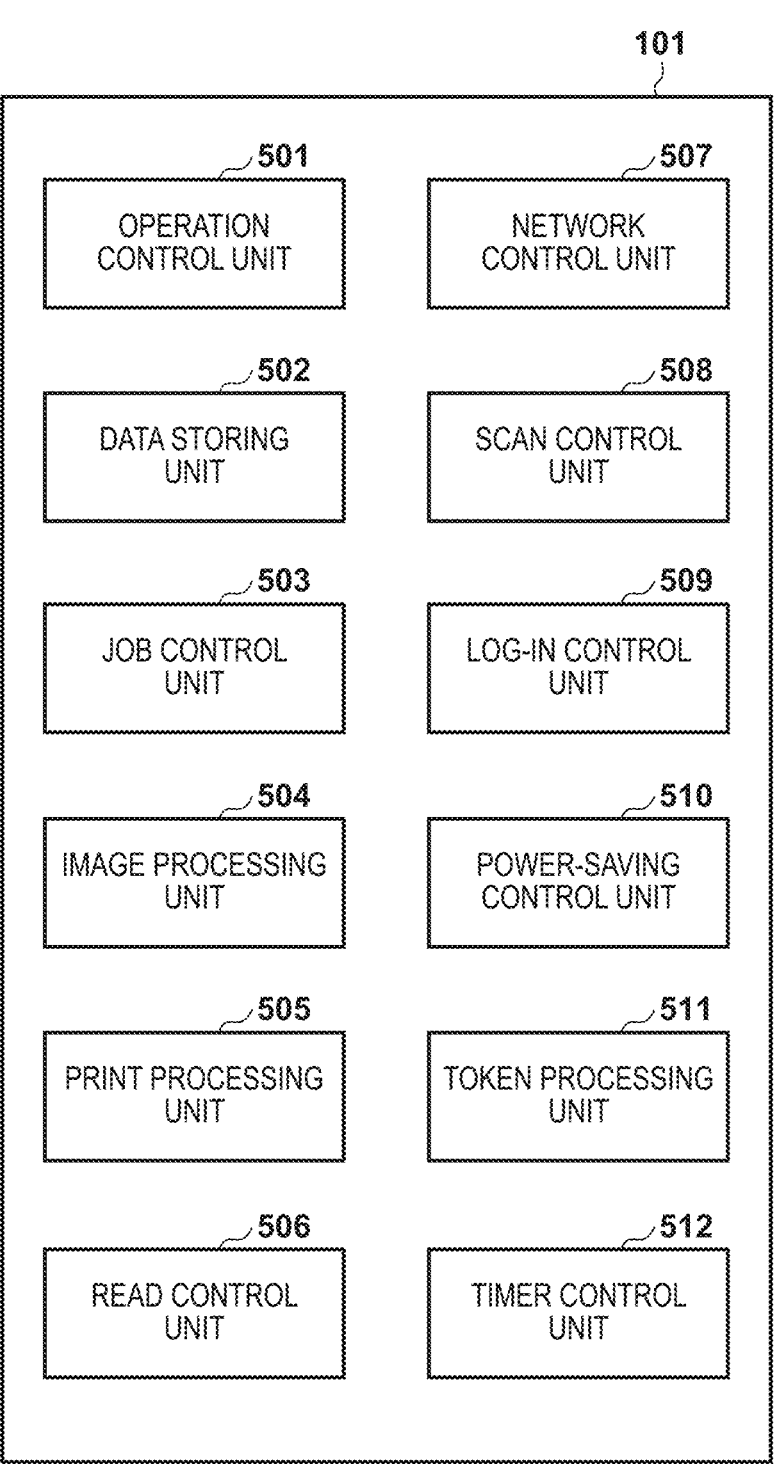

F I G.  6
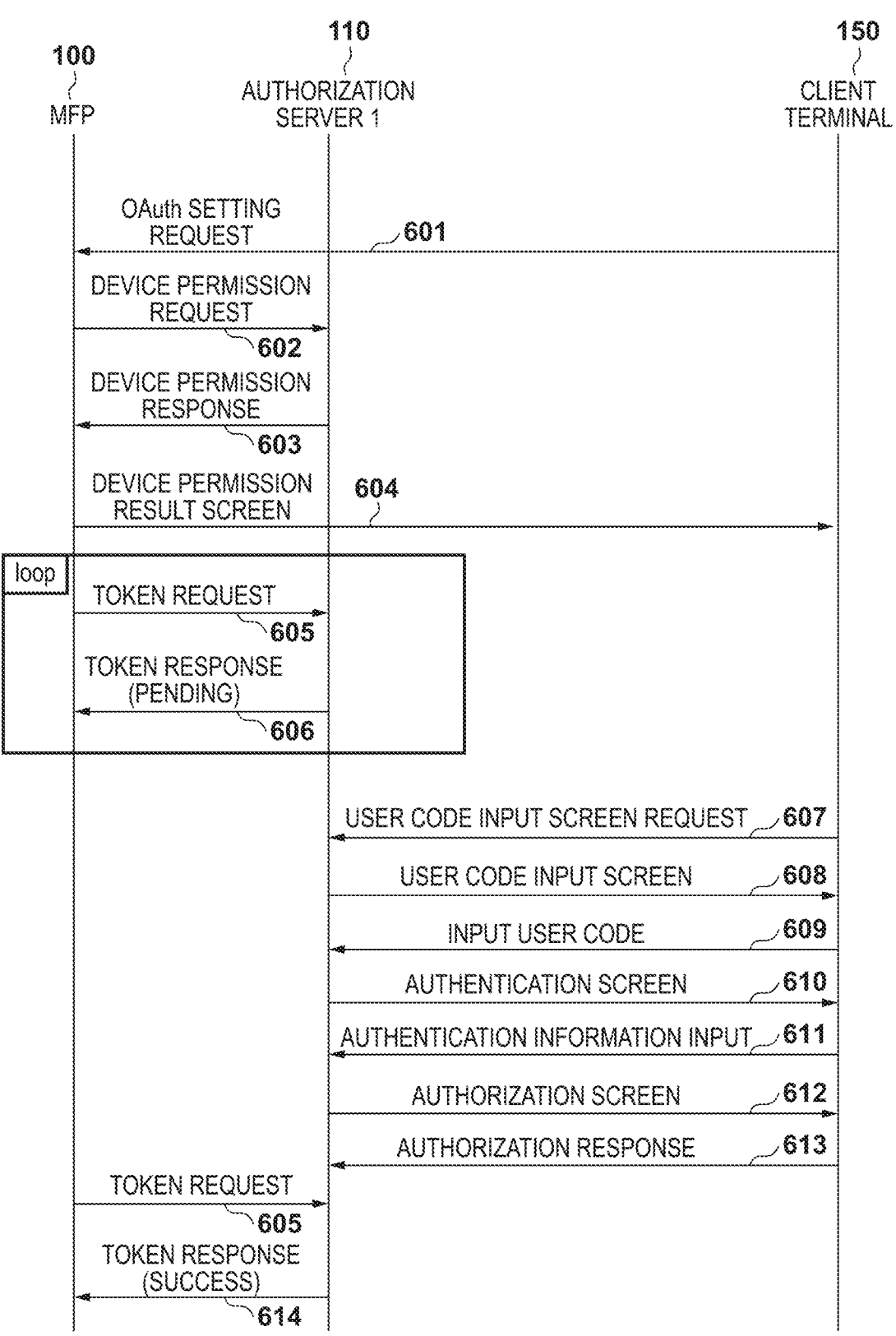

FIG. 9

TOKEN MANAGEMENT INFORMATION  900

| | ACCESS TOKEN | AT EXPIRATION DATE/TIME | REFRESH TOKEN | RT EXPIRATION DATE/TIME | CLIENT ID | SERVICE TO BE USED |
|---|---|---|---|---|---|---|
| | 901 | 902 | 903 | 904 | 905 | 906 |
| | 1111aaaa | 2022/12/15 13:20:00 | 2222bbbb | 2022/01/15 13:00:00 | 11111111 | AAA CORPORATION E-MAIL |
| | 3333aaaa | 2022/12/15 13:30:00 | 4444bbbb | 2022/01/15 13:00:00 | 22222222 | BBB CORPORATION STORAGE SERVICE |
| | -------- | -------- | -------- | -------- | -------- | -------- |

F I G. 10
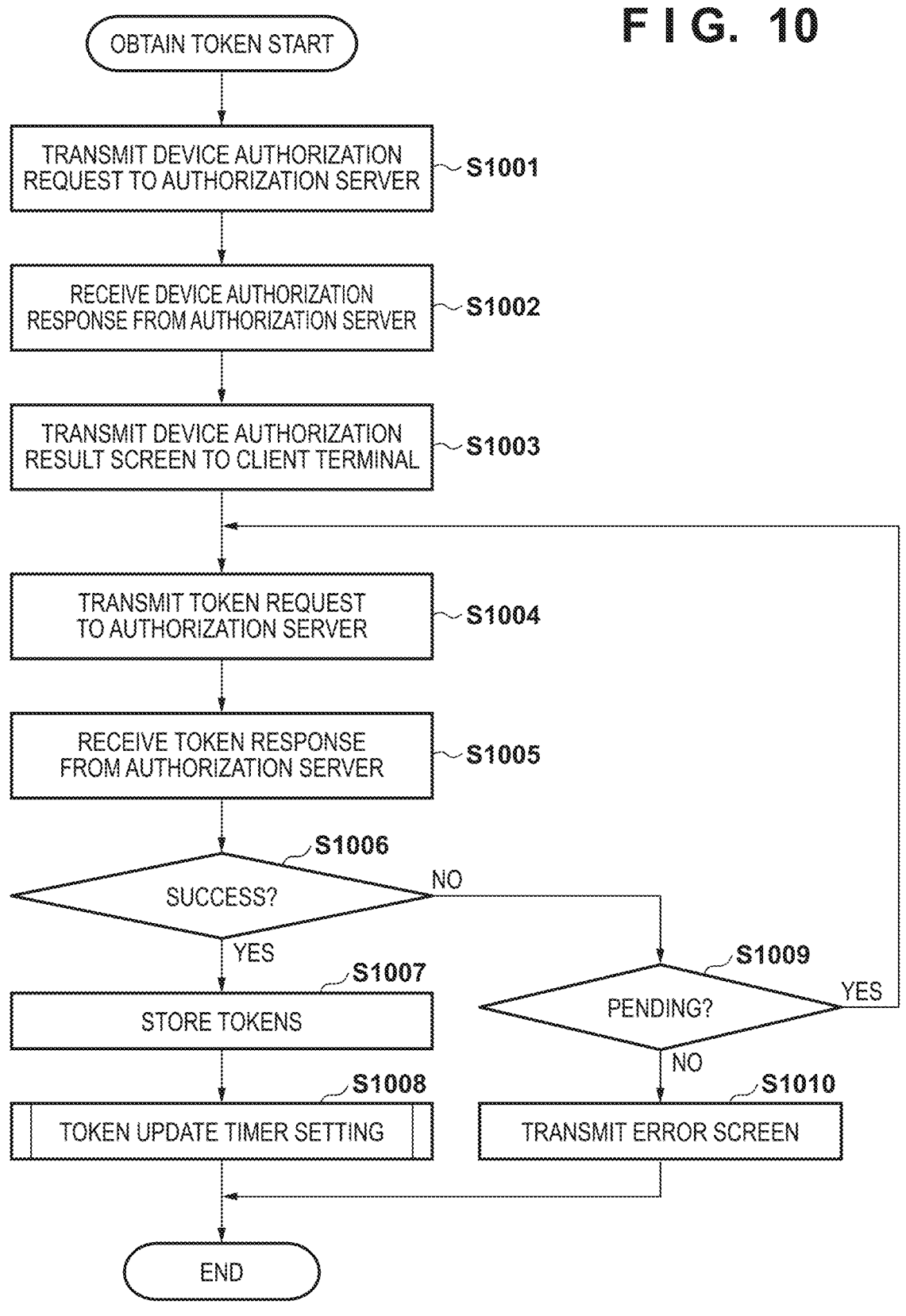

F I G. 13
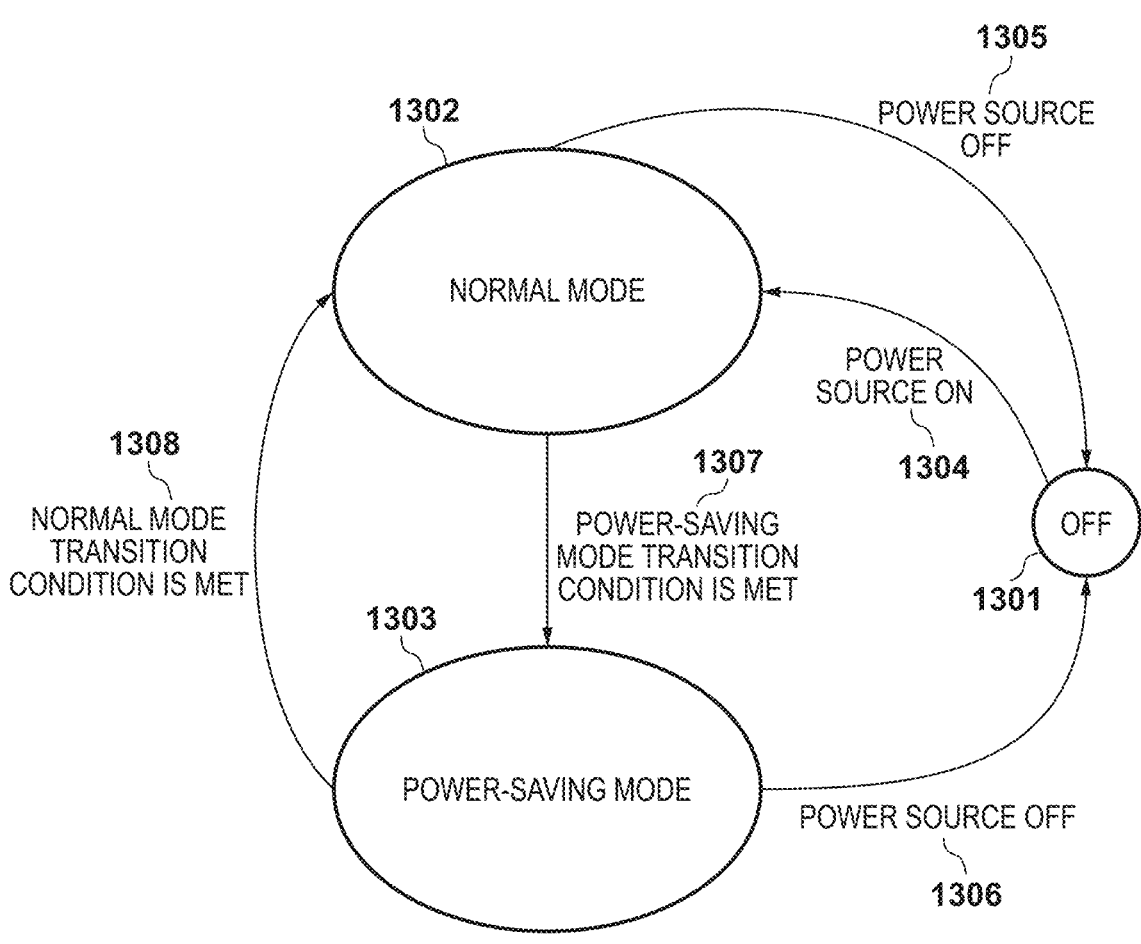

F I G. 14
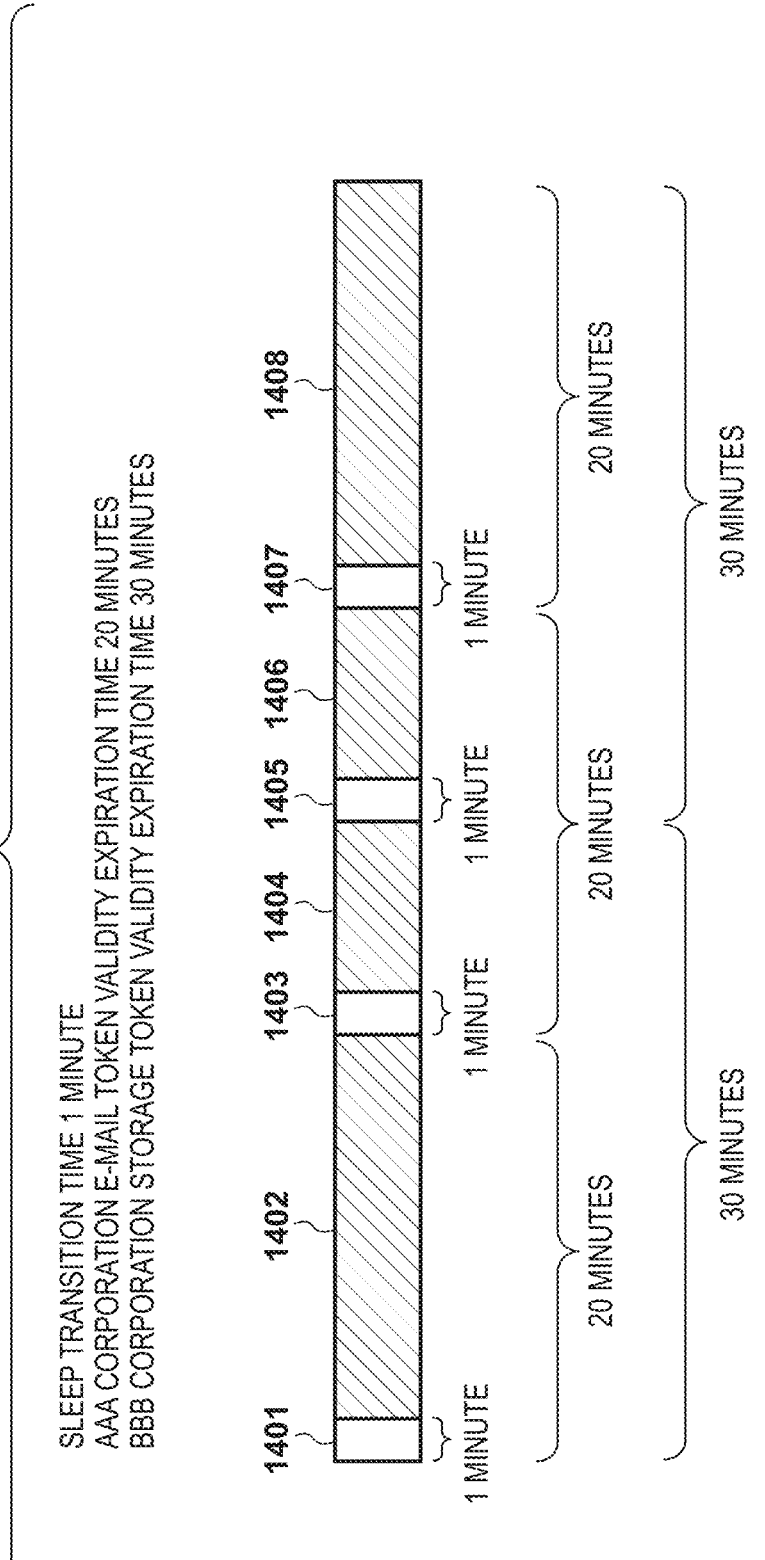
SLEEP TRANSITION TIME 1 MINUTE
AAA CORPORATION E-MAIL TOKEN VALIDITY EXPIRATION TIME 20 MINUTES
BBB CORPORATION STORAGE TOKEN VALIDITY EXPIRATION TIME 30 MINUTES

FIG. 15

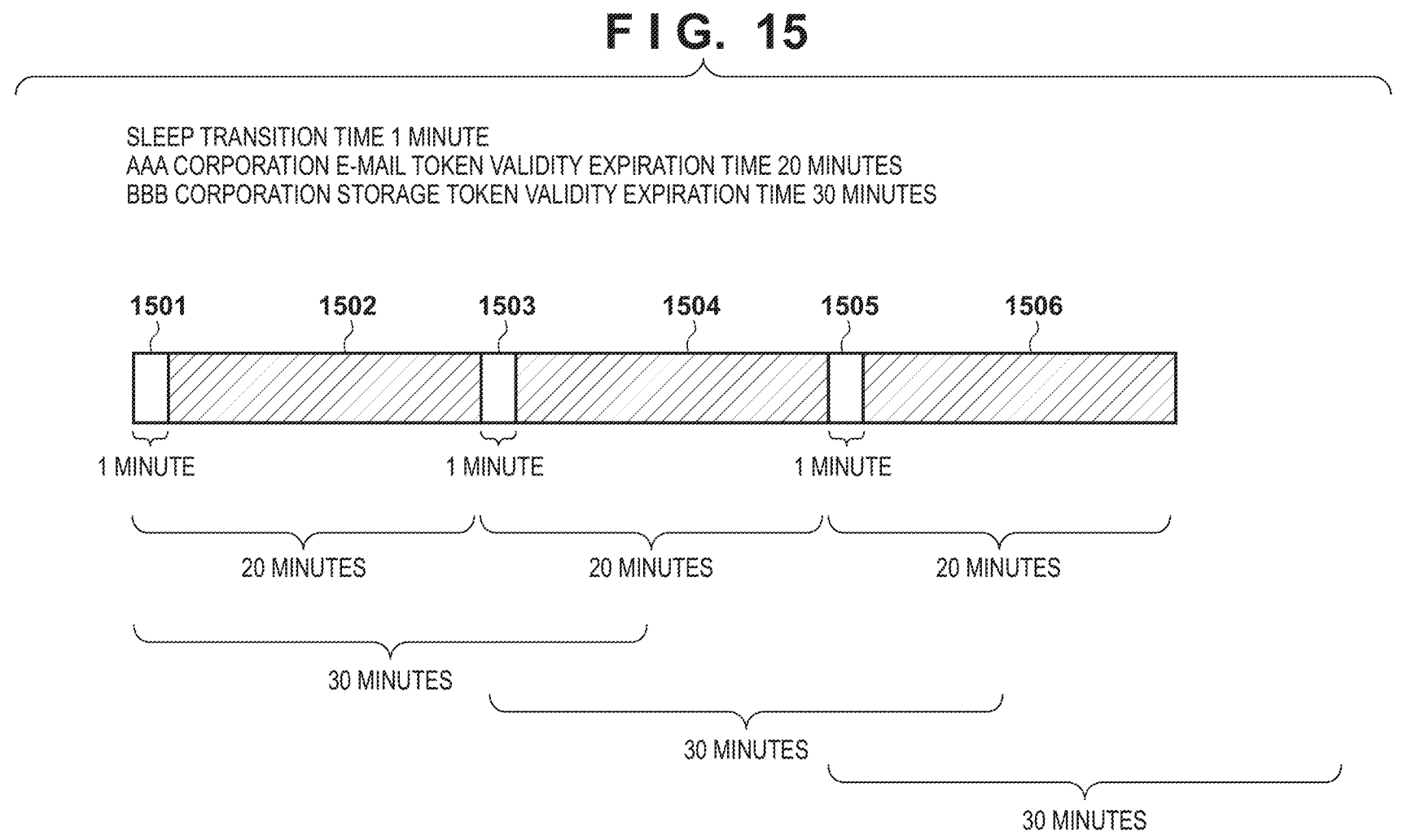

SLEEP TRANSITION TIME 1 MINUTE
AAA CORPORATION E-MAIL TOKEN VALIDITY EXPIRATION TIME 20 MINUTES
BBB CORPORATION STORAGE TOKEN VALIDITY EXPIRATION TIME 30 MINUTES 1501    1502    1503    1504    1505    1506

1 MINUTE

1 MINUTE

1 MINUTE

20 MINUTES

20 MINUTES

20 MINUTES

30 MINUTES

30 MINUTES

30 MINUTES

F I G. 16
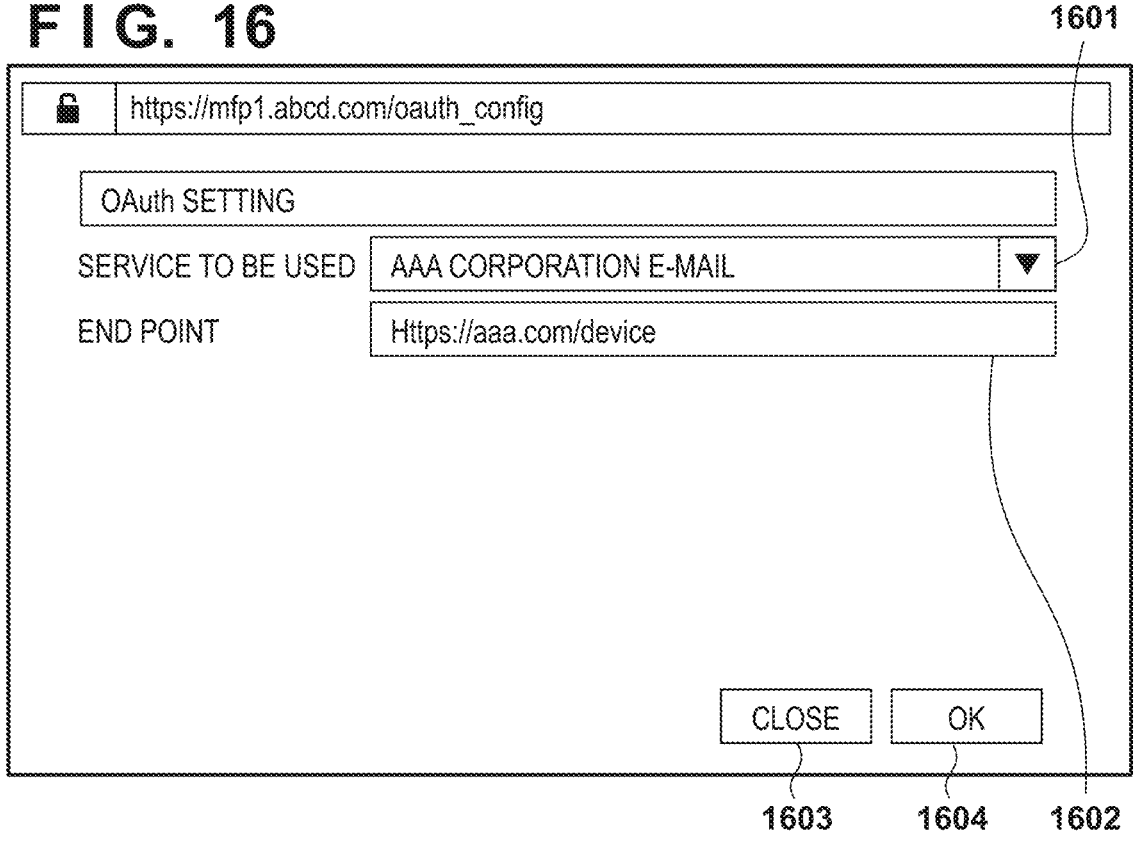
F I G. 17
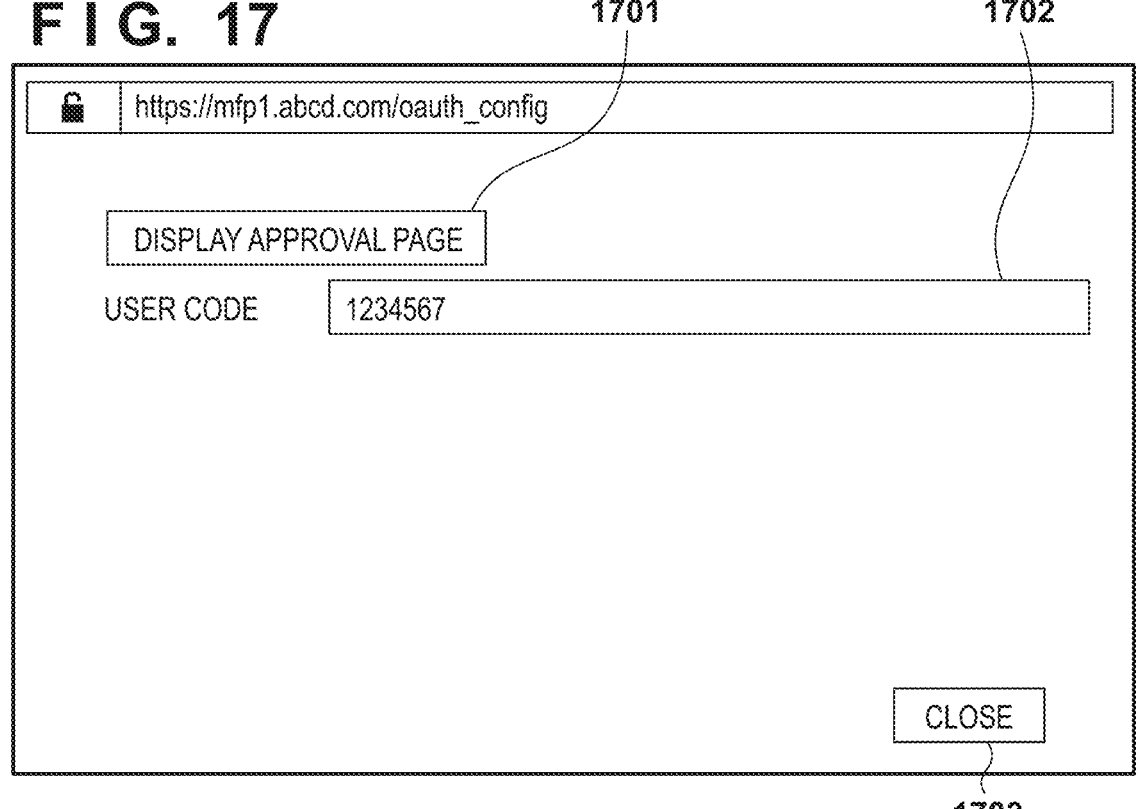

F I G. 18
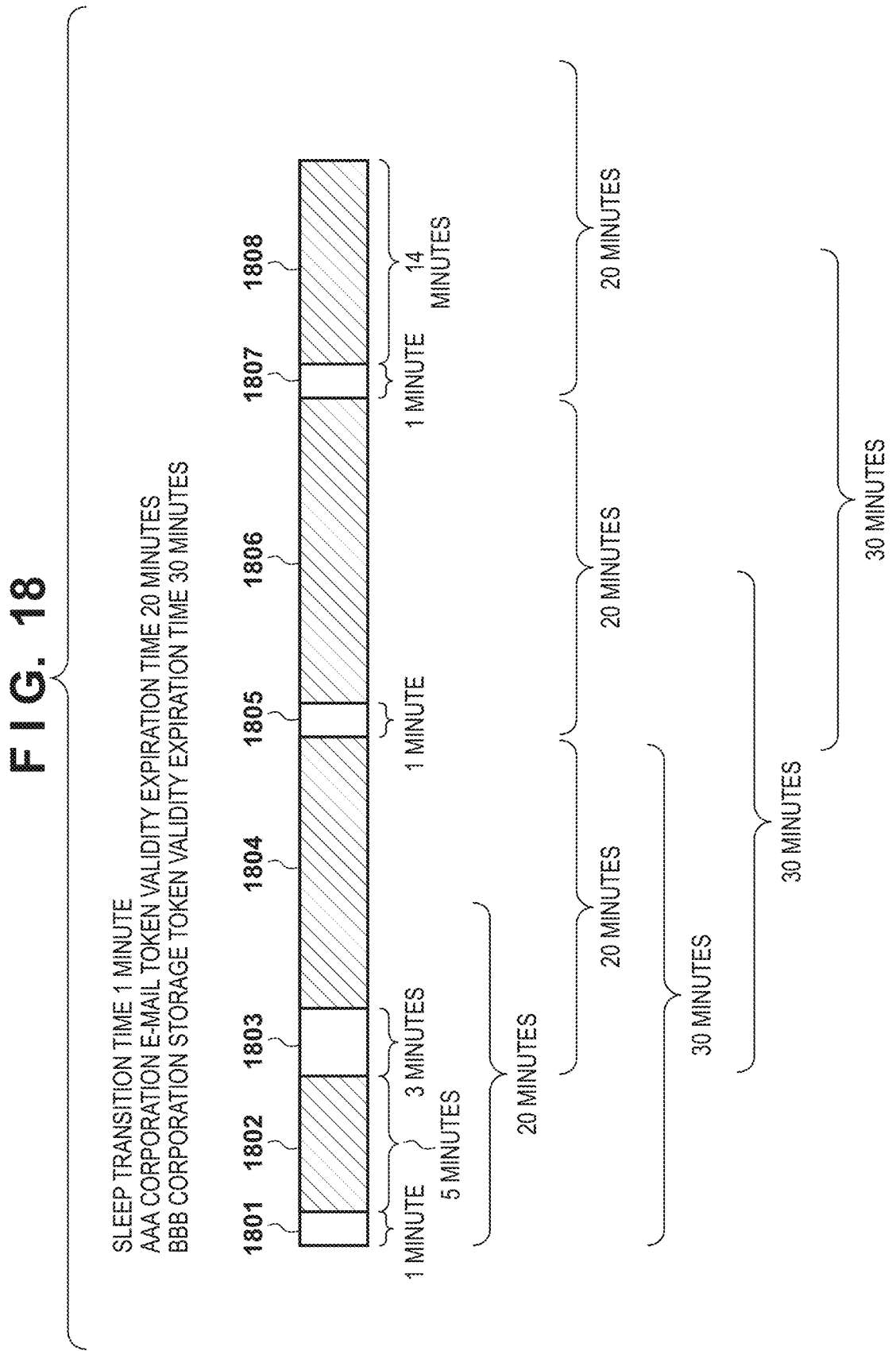
SLEEP TRANSITION TIME 1 MINUTE
AAA CORPORATION E-MAIL TOKEN VALIDITY EXPIRATION TIME 20 MINUTES
BBB CORPORATION STORAGE TOKEN VALIDITY EXPIRATION TIME 30 MINUTES

TOKEN MANAGEMENT INFORMATION

| | 901 | 902 | 903 | 904 | 905 | 906 |
|---|---|---|---|---|---|---|
| | ACCESS TOKEN | AT EXPIRATION DATE/TIME | REFRESH TOKEN | RT EXPIRATION DATE/TIME | CLIENT ID | SERVICE TO BE USED |
| | 1111aaaa | 2022/12/15 13:20:00 | 2222bbbb | 2022/01/15 13:00:00 | 11111111 | AAA CORPORATION E-MAIL |
| | 3333aaaa | 2022/12/15 13:50:00 | 4444bbbb | 2022/01/15 13:00:00 | 22222222 | BBB CORPORATION STORAGE |
| | ---------- | ---------- | ---------- | ---------- | ---------- | ---------- |

F I G. 20
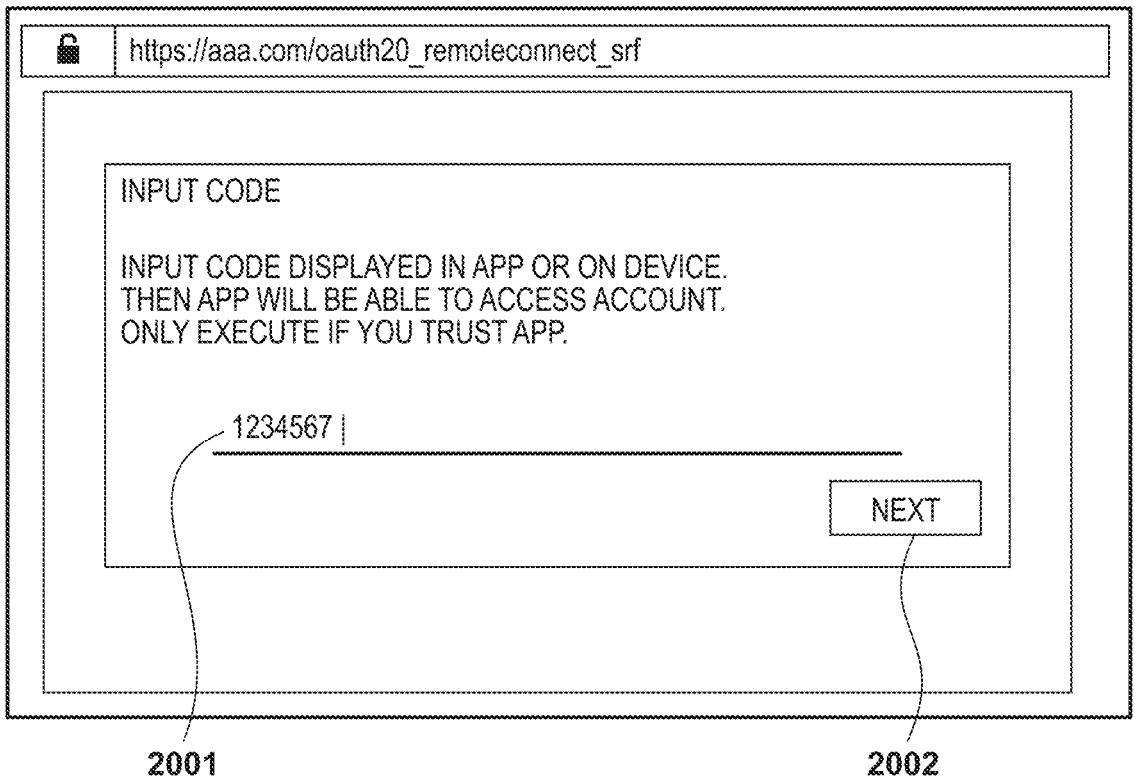
2001    2002
F I G. 21
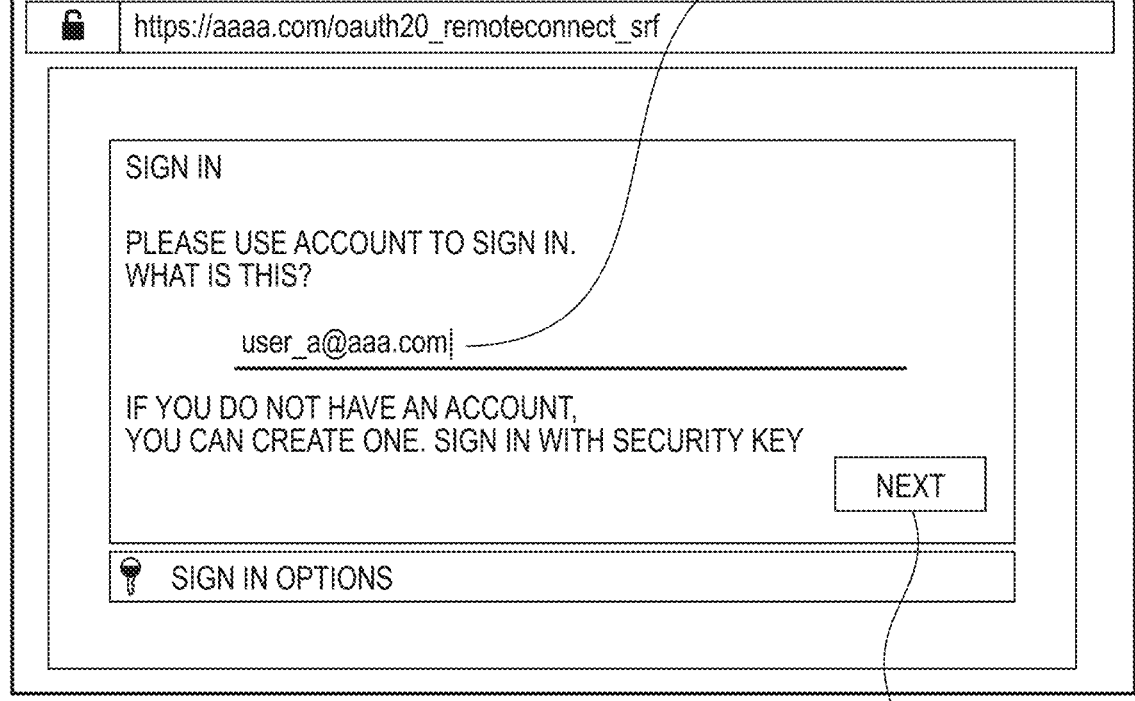
2101
2102

F I G. 22

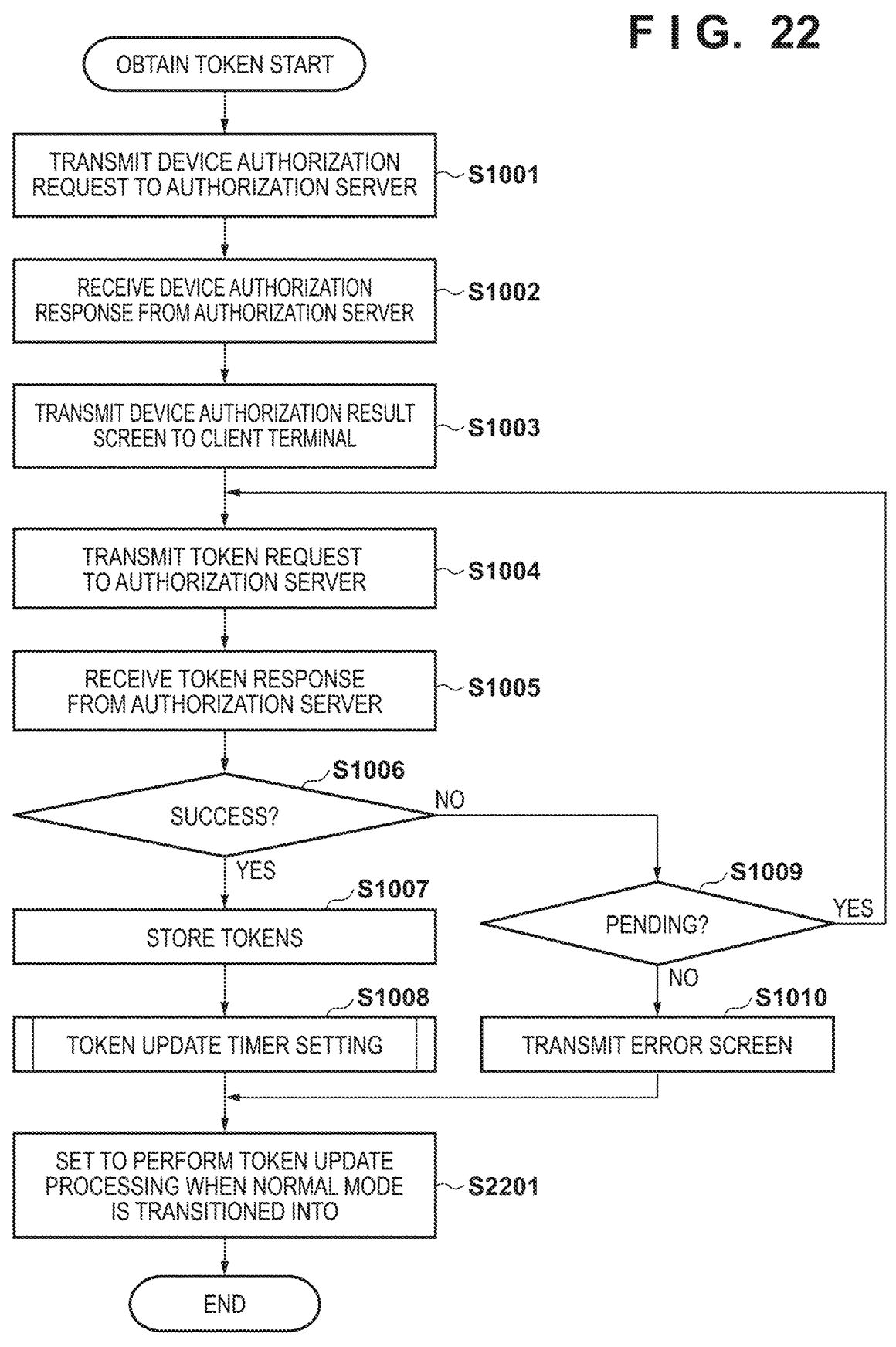

OBTAIN TOKEN START

TRANSMIT DEVICE AUTHORIZATION REQUEST TO AUTHORIZATION SERVER — S1001

RECEIVE DEVICE AUTHORIZATION RESPONSE FROM AUTHORIZATION SERVER — S1002

TRANSMIT DEVICE AUTHORIZATION RESULT SCREEN TO CLIENT TERMINAL — S1003

TRANSMIT TOKEN REQUEST TO AUTHORIZATION SERVER — S1004

RECEIVE TOKEN RESPONSE FROM AUTHORIZATION SERVER — S1005

S1006
SUCCESS?
— NO
YES

S1007
STORE TOKENS

S1009
PENDING? — YES
NO

S1008
TOKEN UPDATE TIMER SETTING

S1010
TRANSMIT ERROR SCREEN

SET TO PERFORM TOKEN UPDATE PROCESSING WHEN NORMAL MODE IS TRANSITIONED INTO — S2201

END

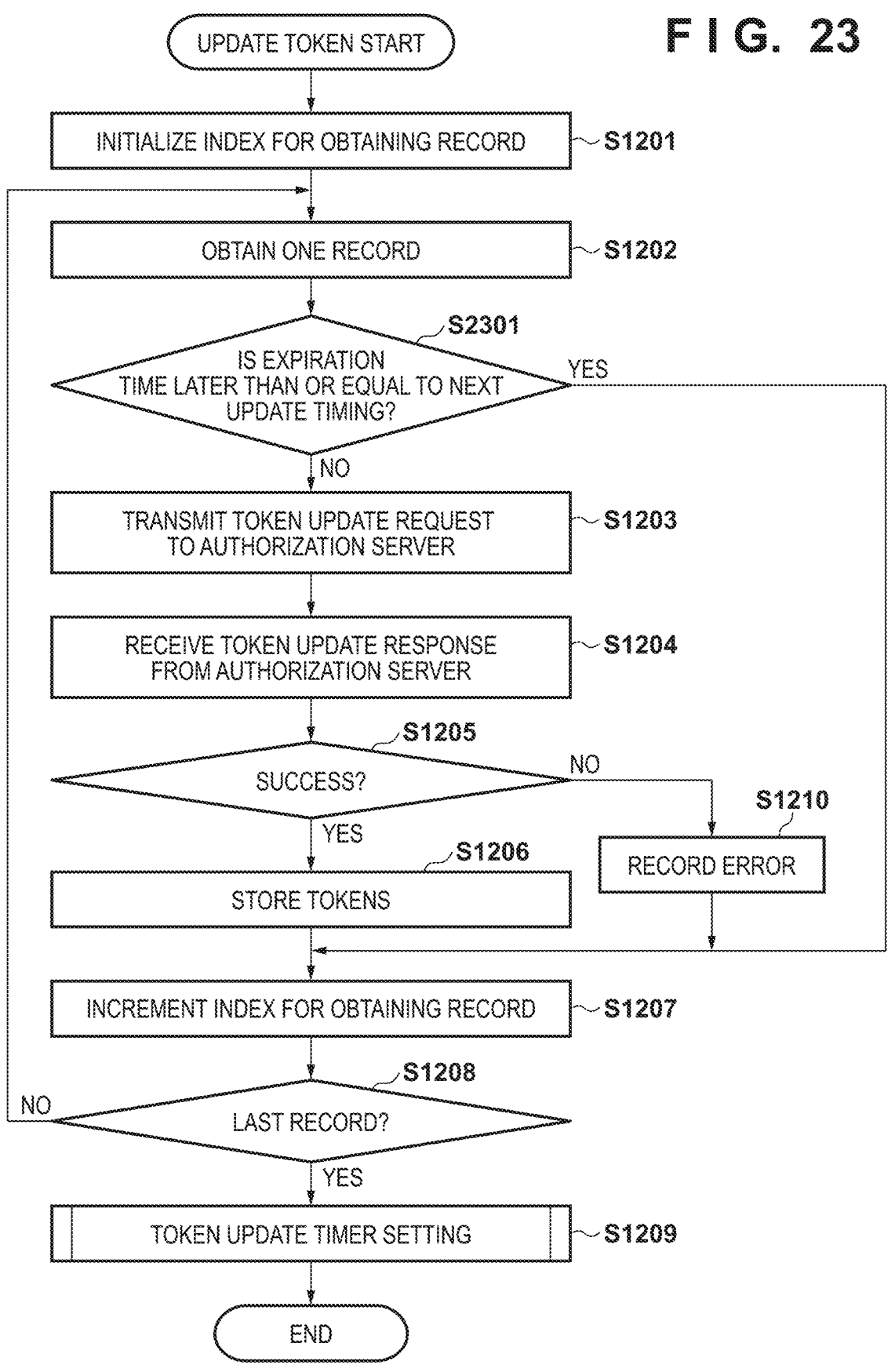
F I G. 23

SYSTEM AND METHOD FOR UPDATING ACCESS TOKENS IN AN INFORMATION PROCESSING APPARATUS

BACKGROUND

Field

The present disclosure relates to improvement in a power-saving operation time of an image processing apparatus that has a function that supports a plurality of authorization services.

Description of the Related Art

In recent years, there have been an increasing number of cases where a storage server such as a cloud or a mail server is used as a transmission destination of an image scanned by an image processing apparatus. Access to such a transmission destination is not made through authentication that uses a user name and a password, but is made using an access token issued by approving an authority based on OAuth 2.0 defined in RFC (Request For Comments) 6749, for example. Each access token has an expiration time, and a new access token can be obtained by making a request to an authorization server using a refresh token. As authority transfer systems that use a refresh token, there are known authority transfer systems for which security is further improved by disabling a leaked refresh token without changing a client ID and secret (Japanese Patent Laid-Open No. 2017-27459).

When a plurality of functions respectively support authorization services, there is a need to update an access token used by each of the functions before the expiration times thereof is reached. When an update timing comes while an apparatus is operating in a power-saving mode, the mode of the apparatus temporarily returns to a normal mode, and update processing is performed. For this reason, regarding an apparatus that is using a plurality of access tokens, when each of the access tokens is updated at a timing when the expiration time of the access token is reached, the mode of the apparatus returns to a normal mode every time an access token is reached, and thus an operation time in a power-saving mode is shortened.

SUMMARY

According to the present disclosure, even when a plurality of access tokens are used, an operation period in a power-saving mode is kept from being shortened due to the access tokens being updated.

According to one aspect of the present disclosure, there is provided an information processing apparatus that is capable of communicating with an authorization server, and that has a power-saving function for changing a mode of the information processing apparatus from a normal mode to a power-saving mode in which a power consumption amount is smaller, when a predetermined condition is satisfied, the information processing apparatus comprising: at least one memory storing instructions; and at least one processor that, upon execution of the stored instructions, is configured to perform operations including; obtaining an access token and an expiration time of the access token from the authorization server vi a communication, storing an expiration time of the obtained access token and the access token in association with each other, and returning, if the information processing apparatus is in the power-saving mode, to the normal mode and updating at least some of obtained and stored access tokens when an expiration time of at least one access token out of the obtained and stored access tokens is reached.

According to the present disclosure, it is possible to keep an operation time in a power-saving mode from being shortened, without reducing the power-saving effect.

Further features of the present disclosure will become apparent from the following description of exemplary embodiments with reference to the attached drawings.

BRIEF DESCRIPTION OF THE DRAWINGS

FIG. 1 is a system configuration diagram according to the present disclosure.

FIG. 2 is an internal configuration diagram of a controller unit of an MFP.

FIG. 3 is an internal configuration diagram of a controller unit of an authorization server/e-mail server/storage server.

FIG. 4 is an internal configuration diagram of a controller unit of a client terminal.

FIG. 5 is a block configuration diagram of software that is executed in a controller of the MFP.

FIG. 6 is a sequence diagram in which the MFP obtains an access token from an authorization server.

FIG. 9 is a diagram showing an example of a token information management table of the MFP.

FIG. 10 is a flowchart in which the MFP obtains an access token from the authorization server.

FIG. 13 is a state transition diagram of the MFP.

FIG. 14 is a time chart of the MFP.

FIG. 15 is a time chart of the MFP.

FIG. 16 is a diagram showing an OAuth setting screen example of the MFP.

FIG. 17 is a diagram showing a device authorization result screen example of the MFP.

FIG. 18 is a time chart of the MFP

FIG. 19 is a diagram showing an example of the token information management table of the MFP.

FIG. 20 is a diagram showing a user code input screen example.

FIG. 21 is a diagram showing an authentication screen example.

FIG. 22 is a flowchart in which the MFP obtains an access token from the authorization server.

FIG. 23 is a flowchart in which the MFP updates a token.

DESCRIPTION OF THE EMBODIMENTS

First Embodiment

Figure 7:
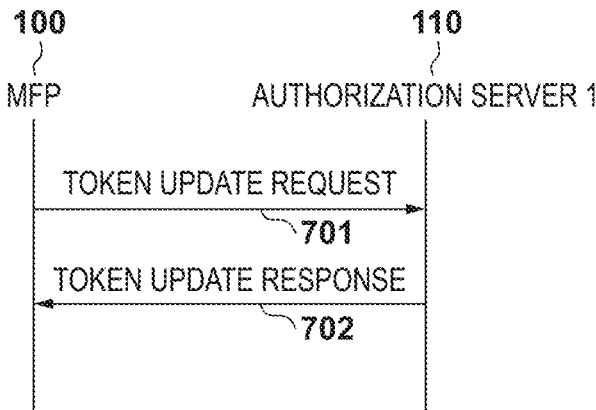
FIG. 7 is a sequence diagram in which the MFP updates an access token in cooperation with an authorization server.

Hereinafter, embodiments will be described in detail with reference to the attached drawings. Note, the following embodiments are not intended to limit the scope of the claimed disclosure. Multiple features are described in the embodiments, but limitation is not made to an disclosure that requires all such features, and multiple such features may be combined as appropriate. Furthermore, in the attached drawings, the same reference numerals are given to the same or similar configurations, and redundant description thereof is omitted.

In embodiments of the present disclosure, an example of a service for which an image processing apparatus, a client terminal such as a PC (personal computer) or a smartphone, an authorization server, and a storage server cooperate with each other will be described.

System Configuration

FIG. 1 shows an example of a system configuration according to the present embodiment. A system according to the present embodiment includes a multifunction peripheral (MFP) 100, an authorization server 110, an e-mail server 120, an authorization server 130, a storage server 140, and a client terminal 150. With focus on a function for handling images, the MFP 100 is also called an "image processing apparatus" or an "image forming apparatus". The MFP 100 is capable of processing information, and thus is also called an "information processing apparatus". The MFP 100, the authorization server 110, the e-mail server 120, the authorization server 130, the storage server 140, and the client terminal 150 are connected via a network 160. The network 160 may adopt either wired connection or wireless connection, and may be either the Internet or an intranet. The network 160 may have any aspect as long as data can be transmitted/received whether wireless connection such as Wi-Fi or a data communication line is adopted, for example. All of the MFP 100, the authorization server 110, the e-mail server 120, the authorization server 130, the storage server 140, and the client terminal 150 do not need to support the same network type. An aspect can be adopted in which, for example, the MFP 100, the authorization server 110, the e-mail server 120, the authorization server 130, and the storage server 140 are connected to the Internet by wire, and the client terminal 150 is connected by a data communication line.

The MFP 100 is an image processing apparatus, and reads an image as a scanner and prints an image as a printer. The MFP 100 has an operating unit 102 that receives/outputs data from/to the user. The MFP 100 has a printer unit 103 that outputs electronic data to a paper medium. The MFP 100 has a scanner unit 104 that reads a paper medium and converts it into electronic data. The operating unit 102, the printer unit 103, and the scanner unit 104 are connected to a controller unit 101, and realizes functions of a multifunction peripheral in accordance with control by the controller unit 101. There is an MFP user DB 105 that stores information regarding MFP users for performing authentication when the MFP 100 is used. An image storage 106 includes a primary region in which temporary image data such as data that is used by the printer unit 103, and data obtained through conversion performed by the scanner unit 104 are stored, and a long-time storage region in which image data that needs to be stored for a longer period is stored. In addition, the MFP 100 has a power-saving function for changing the mode thereof from a normal operation state (normal mode) to a power-saving mode when a predetermined condition is satisfied such as when a predetermined time set in advance has elapsed without any operation.

The authorization server 110 is configured including an authorization service 111. The authorization service 111 is operated in compliance with the framework of OAuth 2.0 defined in RFC 6749, for example. The authorization server 130 is configured including an authorization service 131. The authorization service 131 is operated in compliance with the framework of OAuth 2.0 defined in RFC 6749, for example. The authorization server 110 and the authorization server 130 are configured using a known technique, and thus a detailed description thereof is omitted.

The e-mail server 120 is configured including an e-mail service 121 and a mail box 122. Upon receiving an instruction from the MFP 100, the e-mail server 120 transmits an e-mail in compliance with SMTP (simple mail transfer protocol) defined in RFC 5321. In addition, upon receiving an instruction from the MFP 100, the e-mail server 120 obtains a mail stored in the mail box 122. Mails may be transmitted and obtained in accordance with POP (post office protocol) defined in RFC 5034 or IMAP (Internet message access protocol) defined in RFC 3501.

The e-mail server 120 is given an access token from the MFP 100, makes an inquiry to the authorization server 110 about whether the access token is valid, and rejects access if the access token is invalid. The e-mail server 120 is configured using a known technique, and thus a detailed description thereof is omitted.

The storage server 140 is configured including a storage service 141 and a storage 142. Upon receiving an instruction from the MFP 100, the storage server 140 obtains a file stored in the storage 142, returns a directory list, stores a file in the storage 142, and the like.

The storage server 140 is given an access token from the MFP 100, makes an inquiry to the authorization server 130 about whether the access token is valid, and rejects access if the access token is invalid. The storage server 140 is configured using a known technique, and thus a detailed description thereof is omitted.

The authorization server 110 performs authorization regarding the e-mail server 120, and the authorization server 130 performs authorization regarding the storage server 140.

The client terminal 150 is configured including a Web browser 151. In FIG. 1, one client terminal 150 is provided, but there may be a plurality of client terminals 150. Examples of the client terminal include a smartphone, a tablet, a PC, and the like. Note that FIG. 1 illustrates only configurations for describing the present embodiment, and thus it goes without saying that configurations other than those configurations may be included, and connection forms between constituent elements are not limited to those described above.

Configuration of Controller Unit of MFP

Figure 2:
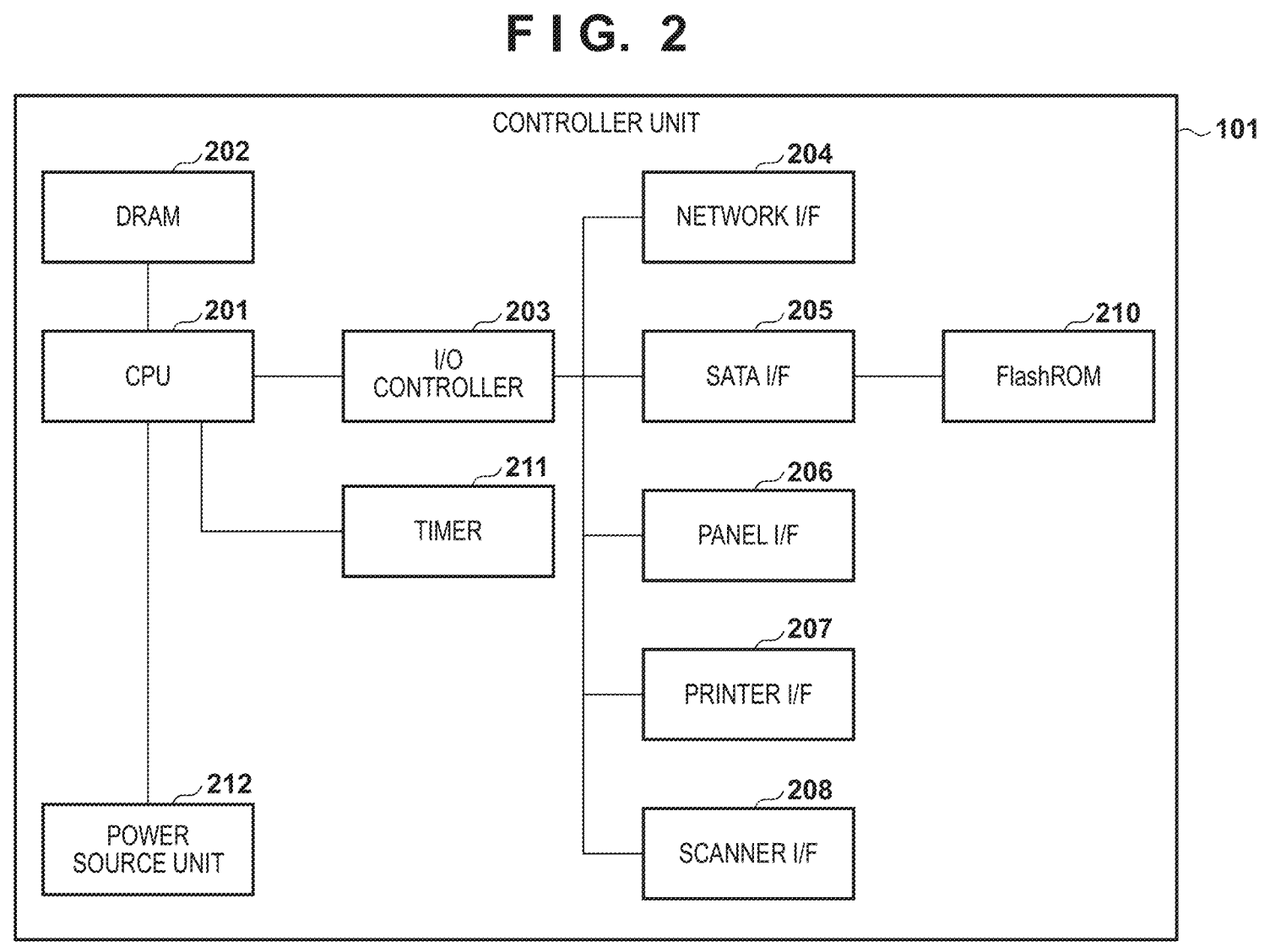

FIG. 2 is a block diagram showing details of the controller unit 101 of the MFP. A CPU 201 performs main computation processing in the controller unit 101. The CPU 201 is connected to a DRAM 202 via a bus. The DRAM 202 is used by the CPU 201 as a work memory for temporarily storing data to be processed and a program that indicates a computation instruction in a process in which the CPU 201 performs computation. The CPU 201 is connected to an I/O controller 203 via a bus. The I/O controller 203 receives/outputs data from/to various devices in accordance with an instruction from the CPU 201. An SATA (serial advanced technology attachment) I/F 205 is connected to the I/O controller 203, and a FlashROM 210 is connected to the SATA I/F 205. The CPU 201 uses the FlashROM 210 to persistently store a program for realizing a function of the MFP, and a document file. A large-capacity storage apparatus such as an HDD may be connected to the SATA I/F 205 in place of a FlashROM.

A network I/F 204 is connected to the I/O controller 203. Wired LAN devices and wireless LAN devices are connected to the network I/F 204. The CPU 201 realizes communication on the network 160 by controlling the wired LAN devices and the wireless LAN devices via the network I/F 204. A panel I/F 206 is connected to the I/O controller 203, and the CPU 201 realizes, for the user, input/output of data to/from the operating unit 102 via the panel I/F 206. A printer I/F 207 is connected to the I/O controller 203, the CPU 201 realizes processing for outputting a paper medium using the printer unit 103 via the printer I/F 207.

The CPU 201 is electrically connected to a timer 211 and a power source unit 212. The power source unit 212 includes a power switch, and supplies power to a controller when the power switch is on, and stops supply of power to the controller when the power switch is off. Note that, even when the power switch is on, only a specific device is supplied with power while the MFP 100 is operating in a power-saving mode, thus reducing the power consumption amount of the MFP 100. The timer 211 performs time measurement for measuring a set time, and, when the set time has elapsed, notifies the CPU 201 that time is up.

The MFP 100 has various applications for using functions of the MFP. Examples of such functions include a copy function, a transmission function, a facsimile function, a box function, and the like. When the copy function is implemented, for example, the CPU 201 loads program data from the FlashROM 210 to the DRAM 202 via the SATA I/F 205. The CPU 201 detects a copy instruction given on the operating unit 102 by the user, via the panel I/F 206 in accordance with the program loaded to the DRAM 202. When the copy instruction is detected, the CPU 201 receives a document from the scanner unit 104 via a scanner I/F 208 as electronic data (image data), and stores the data in the receiving DRAM 202. The CPU 201 performs color conversion processing, which is suitable for output, on the image data stored in the DRAM 202, and the like. The CPU 201 transfers the image data stored in the DRAM 202 to the printer unit 103 via the printer I/F 207, and performs processing for outputting the image data to a paper medium.

The transmission function is the same as the above copy function, in terms of processing in which the CPU 201 detects an instruction from the user. A transmission instruction includes a transmission protocol, a designated transmission destination, an image format, and the like from the user. The transmission protocol is SMTP, SMB, WebDAV, FTP, or the like. The transmission destination is designated using an e-mail address, UNC (universal naming convention), URI (unified resource identifier), or the like. The image format is JPEG, PDF, or the like.

When a transmission instruction is detected, the CPU 201 receives a document from the scanner unit 104 via the scanner I/F 208 as electronic data, and stores the data in the receiving DRAM 202. The CPU 201 performs image format conversion designated by the user, and the like, on the image data stored in the DRAM 202. The CPU 201 transfers the image data stored in the DRAM 202 to the transmission destination via the network I/F 204, using a protocol designated by the user. A configuration may be adopted in which, when the transmission protocol is an e-mail, the e-mail server 120 is designated as an SMTP server, and transmission is performed using a framework of authorization that uses an access token. In addition, a configuration may also be adopted in which, when the transmission protocol is SMB, the storage server 140 is designated as a transmission destination, and transmission is performed using a framework of authorization that uses an access token.

The facsimile function is the same as the above copy function, in terms of processing in which the CPU 201 detects an instruction of the function from the user. When a facsimile instruction is detected, the CPU 201 receives a document from the scanner unit 104 via the scanner I/F 208 as electronic data, and stores the data in the receiving DRAM 202. The CPU 201 performs image format conversion for facsimile, and the like, on the image data stored in the DRAM 202. The CPU 201 transfers the image data stored in the DRAM 202 to the phone number of a facsimile machine designated in the facsimile instruction, or the like, via a phone line network (not illustrated) connected to a facsimile I/F 209, or the like. Facsimile that uses a phone line is exemplary, and may be Internet facsimile.

The box function is a function for storing a scanned image in a storage region in the MFP 100 or a memory medium connected to the MFP 100. Furthermore, the BOX function also includes a function for publicizing an image stored in the MFP 100 to an external PC (not illustrated) or another MFP, by the MFP 100 operating as a file server. The box function is the same as the above copy function in terms of processing in which the CPU 201 detects an instruction of the function from the user. A box storing instruction includes a designated storing destination, an image format, and the like from the user. The storing destination is an internal storage of the MFP 100 or a path of a memory medium connected to the MFP 100. The image format is JPEG, PDF, or the like. When a box storing instruction is detected, the CPU 201 receives a document from the scanner unit 104 via the scanner I/F 208 as electronic data, and stores the data in the receiving DRAM 202. The CPU 201 performs image format conversion and the like designated by the user, on the image data stored in the DRAM 202. The CPU 201 transfers the image data stored in the DRAM 202 to a storing destination designated by the user, such as the FlashROM 210 in the MFP 100, a memory medium (not illustrated), or the like, via the SATA I/F 205.

In the facsimile function, instead of printing a received image, data may be converted into a format viewable by a PC or the like, and is then stored in a box. In addition, as the box function, the MFP 100 operates as a file server such as an SMB server, and publicizes the content of the FlashROM 210. In the box function, the CPU 201 detects a box access instruction from the outside via the network I/F 204. The box access instruction includes an image file path of an access destination, and the like. The CPU 201 transfers image data stored in the FlashROM 210 corresponding to the designated image file path, to the requester of the box access instruction via the network I/F 204.

Note that the above-described functions are exemplary functions of the MFP 100, and there may be other functions.

Hardware of Server

FIG. 3 is a block diagram showing details of the authorization server 110, the e-mail server 120, the authorization server 130, and the storage server 140 according to the present embodiment. In the present embodiment, for ease of description, the authorization server 110, the e-mail server 120, the authorization server 130, and the storage server 140 are illustrated as the same block diagram, but may have different configurations. A CPU 301 is connected to a DRAM 302 via a bus. The DRAM 302 is used by the CPU 301 as a work memory for temporarily storing data to be processed and program data that indicates a computation instruction in a process in which the CPU 301 performs computation.

The CPU 301 is connected to an I/O controller 303 via a bus. A network I/F 304 is connected to the I/O controller 303. A wired LAN device and a wireless LAN device are connected to the network I/F 304. The CPU 301 realizes communication on the network 160 by controlling the wireless LAN device and the wired LAN device via the network I/F 304. The I/O controller 303 receives/outputs data from/to various devices in accordance with an instruction from the CPU 301. An SATA (serial advanced technology attachment) I/F 305 is connected to the I/O controller 303, and an HDD 306 is connected to the SATA I/F 305.

The CPU 301 uses the HDD 306 to persistently store the authorization service 111 in a case of the authorization server 110, and programs, setting values, and the like such as the e-mail service 121 and the mail box 122 in a case of the e-mail server 120. In this manner, hardware such as the CPU 301, the DRAM 302, and the HDD 306 constitute a so-called computer. In the present embodiment, to facilitate description, a case is illustrated in which one CPU 301 executes each processing depicted in a flowchart to be described later, using one memory (the DRAM 302), but another aspect may also be adopted. A configuration can also be adopted in which, for example, a plurality of processors, a RAM, a ROM, and a storage cooperate with each other to execute each processing depicted in the flowchart to be described later. In addition, each processing can also be performed using a plurality of server computers.

Hardware of Client Terminal

FIG. 4 is a block diagram showing details of the client terminal 150 according to the present embodiment. A CPU 401 is connected to a DRAM 402 via a bus. The DRAM 402 is used by the CPU 401 as a work memory for temporarily storing data to be processed and program data that indicates a computation instruction in a process in which the CPU 401 performs computation. The CPU 401 is connected to an I/O controller 403 via a bus. A network I/F 404 is connected to the I/O controller 403. A wired LAN device and a wireless LAN device, or a data communication device is connected to the network I/F 404. The CPU 401 realizes communication on the network 160 by controlling the wired LAN device and the wireless LAN device, or the data communication device via the network I/F 404. The I/O controller 403 receives/outputs data from/to various devices in accordance with an instruction from the CPU 401. An SATA I/F 405 is connected to the I/O controller 403, and the FlashROM 406 is connected to the SATA I/F 405. A large-capacity storage apparatus such as an HDD may also be connected to the SATA I/F 405 instead of a FlashROM.

The CPU 401 uses an HDD 410 to persistently store setting values of a program such as a retention scanning application 131, for example. A panel I/F 407 is connected to the I/O controller 403, and the CPU 401 realizes, for the user, input/output of data to/from the operating unit 102 connected to the client terminal 150 via the panel I/F 407. A touch panel is an example of the operating unit 102.

A display device that performs display such as a display and an input device that receives input such as a keyboard may be connected to the panel I/F 407.

Software of MFP

FIG. 5 is a block diagram showing a configuration of software that is executed by the controller unit 101 of the MFP 100. All the software that is executed by the controller unit 101 is executed after the CPU 201 loads a program stored in the FlashROM 210 to the DRAM 202.

An operation control unit 501 displays a screen image for the user on the operating unit 102, detects a user operation, and executes processing associated with a screen component such as a button displayed on the screen. The operation control unit 501 also receives a setting screen and an access request from the client terminal 150 via a Web server unit provided in a network control unit 507. The operation control unit 501 outputs an HTML page for setting values for causing the MFP 100 to operate in accordance with the received setting screen and access request, and executes processing associated with input to the HTML page.

A data storing unit 502 stores a request from another control unit, in the FlashROM 210, and reads out such a request. A job control unit 503 controls execution of a job in accordance with an instruction from another control unit. An image processing unit 504 processes image data into a format suitable for usage in accordance with an instruction from the job control unit 503. A print processing unit 505 prints and outputs an image onto a paper medium via the printer I/F 207 in accordance with an instruction from the job control unit 503. A readout control unit 506 reads a set document via the scanner I/F 208 in accordance with an instruction from the job control unit 503.

The network control unit 507 receives/output data from/to a LAN or public network via the network I/F 204 in accordance with an instruction from each control unit. In addition, the data storing unit 502 makes it possible for an external device to access data stored in the FlashROM 210, via the network control unit 507. Examples of the data stored the FlashROM 210 include images of PDF, JPEG, and the like.

A log-in control unit 509 collates user information input from the operation control unit 501 or the network control unit 507 and user information stored in the MFP user DB 105 with each other, and authorizes the user that has input the user information, to use the MFP 100 if the user information match.

A power-saving control unit 510 performs control so as to change the mode of the MFP 100 to a power-saving mode when a condition for transition to the power-saving mode is met while the MFP 100 is operating in a normal mode, and to change the mode of the MFP 100 to the normal mode when a condition for transition to the normal mode is met while the MFP 100 is operating in the power-saving mode. The normal mode is a mode in which the power source is turned on and power is supplied to the units of the MFP 100. The power-saving mode is a mode in which the power source is on but power is not supplied to a specific unit. Examples of a unit that is not supplied with power include the printer I/F 207, the printer unit 103, the scanner I/F 208, the scanner unit 104, and the like. In addition to this, supply of power to the panel I/F 206, the operating unit 102, and the network I/F 204, or some of them may be stopped.

A token processing unit 511 performs control so as to access the authorization server 110 and the authorization server 130, obtain an access token and a refresh token, and update the access token using the refresh token.

A timer control unit 512 controls the timer 211 so as to execute designated processing at a designated time.

Access Token Obtaining Procedure

FIG. 6 is a diagram of a sequence when the client terminal 150 accesses an OAuth setting screen of the MFP 100 and the MFP 100 obtains an access token from the authorization server 110. The sequence in FIG. 6 illustrates an example in which an access token for accessing the e-mail server 120 is obtained. An access token for accessing the storage server 140 is also obtained in accordance with a procedure similar to that in FIG. 6. In addition, when a plurality of applications installed in the MFP 100 access one server, each of the applications serves as a client. In view of this, in such a case, each application may obtain an access token in accordance with the procedure in FIG. 6.

In step 601, the MFP 100 is accessed through a Web browser of the client terminal 150, the OAuth authorization setting screen is displayed, and setting of OAuth authorization is performed on the MFP 100. FIG. 16 shows an example of the OAuth authorization setting screen. Note that, in the operation of step 601, setting of OAuth authorization may be performed in accordance with an operation performed on the operating unit 102 of the MFP 100, instead of the client terminal 150.

In FIG. 16, a selection portion 1601 is a portion for selecting a service to be used. As one option, it is possible to select one of authorization services that are supported by the MFP 100. Here, assume that an AAA corporation e-mail is selected.

The URL of a device authorization end point of the selected service can be input in a device authorization end point 1602. The URL of the device authorization end point may be uniquely determined according to the service to be used selected in the selection portion 1601, but there are cases where the same service has a different URL depending on a service providing area, a tenant, or the like. For this reason, an editable text input region is used as the device authorization end point 1602. Here, assume that "https://AAA.com/device" is input. In addition, the address of an authorization server 1 is "AAA.com".

A close button 1603 is a button for closing the screen, and the screen is closed by pressing this button. When an OK button 1604 is pressed, an instruction to execute authorization processing based on information input in the service-to-be-used selection portion 1601 and the device authorization end point 1602 is given.

In step 602, a device authorization request is transmitted from the MFP 100 to the device authorization end point of the authorization server 110 designated in the device authorization end point 1602.

In step 603, a device authorization response is transmitted from the authorization server 110 to the MFP 100. Here, a user code and the URL of an end point for which user code approval is performed are transmitted.

In step 604, a device authorization result screen is created based on the device authorization response received by the MFP 100 in step 603, and is transmitted to the client terminal 150 as a response to 601. FIG. 17 shows an example of the device authorization result screen. A jump-to-approval-page button 1701 is linked to the URL of the end point for which the user code received in step 603 is approved, and, when this button is pressed, the screen jumps to the URL of the link destination. A user code display portion 1702 displays the user code received in step 603. Here, assume that, as an example, "1234567" is displayed. When a close button 1703 is pressed, the screen in FIG. 17 is closed. In step 607, in accordance with the user pressing the button 1701, a user code input screen request is transmitted from the client terminal 150 to the authorization server 110.

In step 608, the authorization server 110 transmits a user code input screen to the client terminal 150 as a response to the user code input screen request. FIG. 20 shows an example of the user code input screen. A user code input field 2001 is an input field for inputting the user code displayed on the user code display portion 1702. When a next button 2002 is pressed, the procedure advances to the next process. When a user code character string is input to the user code input field 2001, and the "next" button 2002 is pressed, the client terminal 150 transmits the input user code to the authorization server 110 in step 609.

If the received user code matches the user code displayed on the user code display portion 1702, an authentication screen is transmitted from the authorization server 110 to the client terminal 150, in step 610. FIG. 21 illustrates an example of the authentication screen. In FIG. 21, an account of a service to be authorized is input to a user name input unit 2101. Here, an example is illustrated in which user_a@AAA.com is input. When a next button 2102 is pressed, a screen requesting that user information such as a password be input is displayed, as the next process. Here, although no screen example is illustrated, any screen on which a password can be input and an operation for advancing the procedure to the next process can be performed may be adopted. Alternatively, a configuration may be adopted in which user information and a password can be input on one screen. In step 611, user information such as an input account character string and a password character string is transmitted from the client terminal 150 to the authorization server 110.

Figure 8:
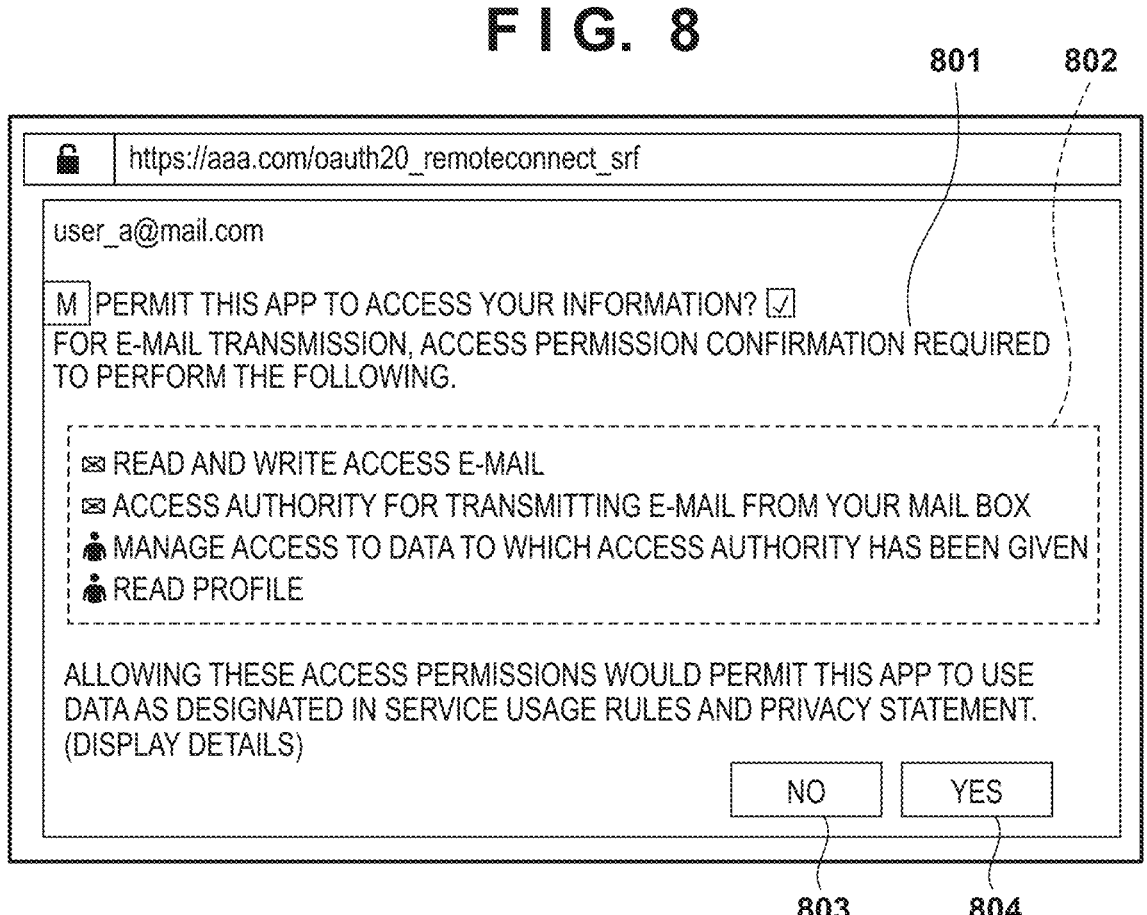
FIG. 8 is a diagram showing an authorization screen example.

In step 612, the authorization server 110 transmits an authorization screen to the client terminal 150. FIG. 8 illustrates an example of the authorization screen. A check box 2201 is a check box indicating whether or not access to an item for which authorization is requested is authorized. Checking this checkbox indicates that access is authorized. Here, an example is illustrated in which the check box is checked.

A request list display portion 2202 is a display portion for a list of items for which authorization has been requested. Here, it indicates that authorities for "access for reading and writing a mail", "access for transmitting a mail from your mail box", "management of access to data for which access has been authorized", and "reading out a profile" are requested.

Pressing a reject button 2203 indicates that the request is not authorized. When this button is pressed, a response of rejection is transmitted from the client terminal 150 to the authorization server 110. Transmission of the response of rejection is not illustrated.

Pressing an authorize button 2204 indicates that the request is authorized. That is to say, by the user pressing the authorize button 2204, transfer of a user authority to the MFP 100 (or an application of the MFP 100) that is a client is authorized. When the authorize button 2204 is pressed, a response of authorization is transmitted from the client terminal 150 to the authorization server 110, in step 613.

On the other hand, after the device authorization result screen is transmitted to the client terminal 150 in step 604, the MFP 100 performs polling for obtaining a token, on a token end point of the authorization server 110. Specifically, in step 605, a token request is transmitted from the MFP 100 to the authorization server 110.

If a corresponding token has not been issued, then, in step 606, a token response (pending) is transmitted from the authorization server 110 to the MFP 100. The token response (pending) is a response that is used when there is no requested token. The authorization server 110 transmits the token response (pending) in response to the token request until a response of authorization in step 613 is received.

When a requested token has been issued, then, in step 614, a token response (successful) is transmitted from the authorization server 110 to the MFP 100. Upon receiving a token request after receiving a response of authorization in step 613, the authorization server 110 transmits the token response (successful). The token response (successful) includes an access token, the expiration date/time of the access token, a refresh token, and the expiration date/time of the refresh token.

The MFP 100 (or an application installed in the MFP 100) that has obtained an access token can access an access destination for which authentication is necessary using the access token. In the example in FIG. 6, the MFP 100 can access the e-mail server 120, and perform transmission/receiving and the like of e-mails.

Processing for Obtaining Token Performed by MFP

FIG. 10 is a flowchart illustrating processing for obtaining a token that is performed by the MFP 100 in the sequence in FIG. 6. All the processing in the flowchart is realized by the CPU 201 executing a program of the token processing unit 511 of the MFP 100. The flowchart is started when the MFP 100 receives an OAuth authorization setting request for the MFP 100, from the client terminal 150.

In step S1001, a device authorization request is transmitted to the authorization server 110. This process is similar to step 602 in FIG. 6, and thus a detailed description thereof is omitted. In step S1002, a device authorization response is received from the authorization server 110. This process is similar to step 603 in FIG. 6, and thus a detailed description thereof is omitted. In step S1003, a device authorization result screen is transmitted to the client terminal 150. This process is similar to step 604 in FIG. 6, and thus a detailed description thereof is omitted.

In step S1004, a token request is transmitted to the authorization server 110. This process is similar to step 605 in FIG. 6, and thus a detailed description thereof is omitted. In step S1005, a token response is received from the authorization server 110.

In step S1006, it is determined whether or not the result of the received token response is successful, and, if the result is successful, the procedure advances to step S1007, otherwise the procedure advances to step S1008. A case where the result of a token response is successful is a case where a "token response (successful)" is received in step 614.

In step S1007, token storing processing is performed. Here, the access token, the expiration date/time of the access token, the refresh token, the expiration date/time of the refresh token, and the like obtained from the authorization server 110 are stored in the FlashROM 210 as one record of token management information. Token management information 900 is information that has a structure such as that illustrated in FIG. 9. In FIG. 9, one row corresponds to information of one record.

In FIG. 9, each record includes an access token 901, an expiration date/time 902 of the access token, a refresh token 903, an expiration date/time 904 of the refresh token, a client ID 905, and a service-to-be-used 906.

The client ID 905 is an identifier or identification information issued by a service provider for the client, such as an application of the MFP 100. In a case where the expiration date/time 902 is received along with the access token, it suffices for the expiration date/time 902 to be stored. In a case where an effective period is received along with an access token, a time and date when the effective period will end if started from the current time and date may be stored as an expiration time.

The service-to-be-used 906 is a service to be used selected in the service-to-be-used selection portion 1601 in FIG. 16. Here, an example is illustrated in which a record in which the service-to-be-used 906 is an AAA corporation e-mail service and a record in which the service-to-be-used 906 is a BBB corporation storage service are held. When a token is registered, and there is another token for the same service to be used, the other token is overwritten with the new token, and if there is no other token for the same service to be used, the new token is recorded.

In step S1008, token update timer setting processing is performed, which will be described with reference to FIG. 11.

If a token is failed to be obtained, it is determined in step S1009 as to whether or not the result of the token response is "pending", and, if the result is "pending", the procedure advances to step S1004, otherwise the procedure advances to step S1010.

In step S1010, a screen informing that authorization has been failed due to an error is created, and is transmitted to the client terminal 150.

The procedure in FIG. 10 describes an example in which the MFP 100 obtains an access token from the authorization server 110 based on a device code flow, but an access token may be obtained based on another authorization flow.

In addition, an example has been described in which the authorization server is the authorization server 110, but, when the BBB corporation storage service is selected in the service-to-be-used selection portion 1601 of the OAuth setting screen, similar processing is performed for the authorization server 130 for performing authorization regarding the storage server 140.

Token Update Timer Setting Processing Performed by MFP

Figure 11:
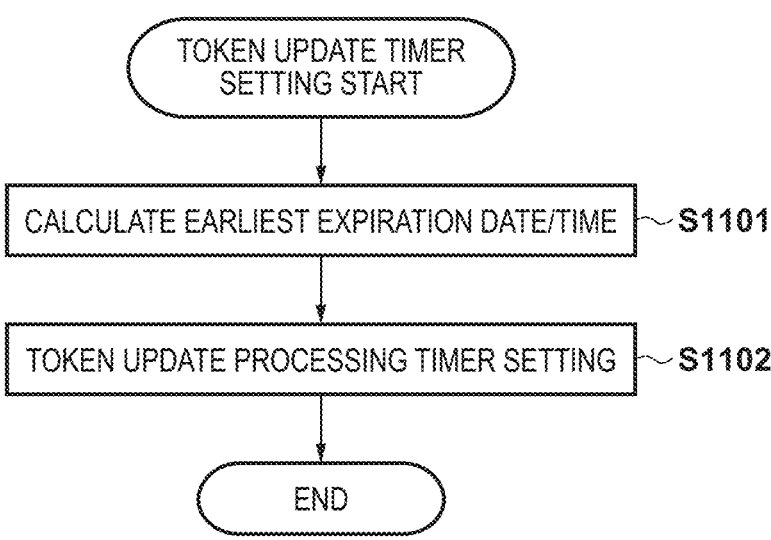
FIG. 11 is a flowchart in which the MFP sets a token update timer.

FIG. 11 is a flowchart illustrating token update timer setting processing in step S1008. All the processing in the flowchart is realized by the CPU 201 performing a program of the token processing unit 511 of the MFP 100.

In step S1101, a record that includes the earliest expiration time of an access token from among the records held in the token management information 900 is searched for. In the example in FIG. 9, "Dec. 15, 2022 13:20:00" of an access token 1111aaaa is the earliest. The earlier the expiration time is, the shorter the remaining effective period becomes, and thus, here, a period whose expiration time is earliest may be called the shortest period.

In step S1102, token update processing start timer setting is performed. The timer control unit 512 is set such that token update processing is performed at the earliest expiration time from among the expiration times of the records stored in the token management information 900, such as "Dec. 15, 2022 13:20:00". In addition, a period from the current time until the next token update processing start time is stored in the FlashROM 210 as an execution timer interval.

Assuming that, for example, the current time is "Dec. 15, 2022 13:00:00", the execution timer interval is 20 minutes.

As described above, every time a token is obtained, the token update timer is reset. Accordingly, the earliest update timing among the update timings of obtained valid tokens and a time until the earliest update timing are set in the timer. Note that either the earliest update timing or a time until the earliest update may be set in the timer.

Update of Token

FIG. 7 is a sequence diagram illustrating a sequence for updating a token between the MFP 100 and the authorization server 110.

In step 701, a token update request is transmitted from the MFP 100 to the token end point of the authorization server 110. The token update request includes at least the refresh token 903 associated with an access token to be updated, and the client ID 905.

In step 702, the MFP 100 receives a token update response from the authorization server 110. The token update response includes an access token, the expiration time of the access token, a refresh token, and the expiration time of the refresh token.

Figure 12:
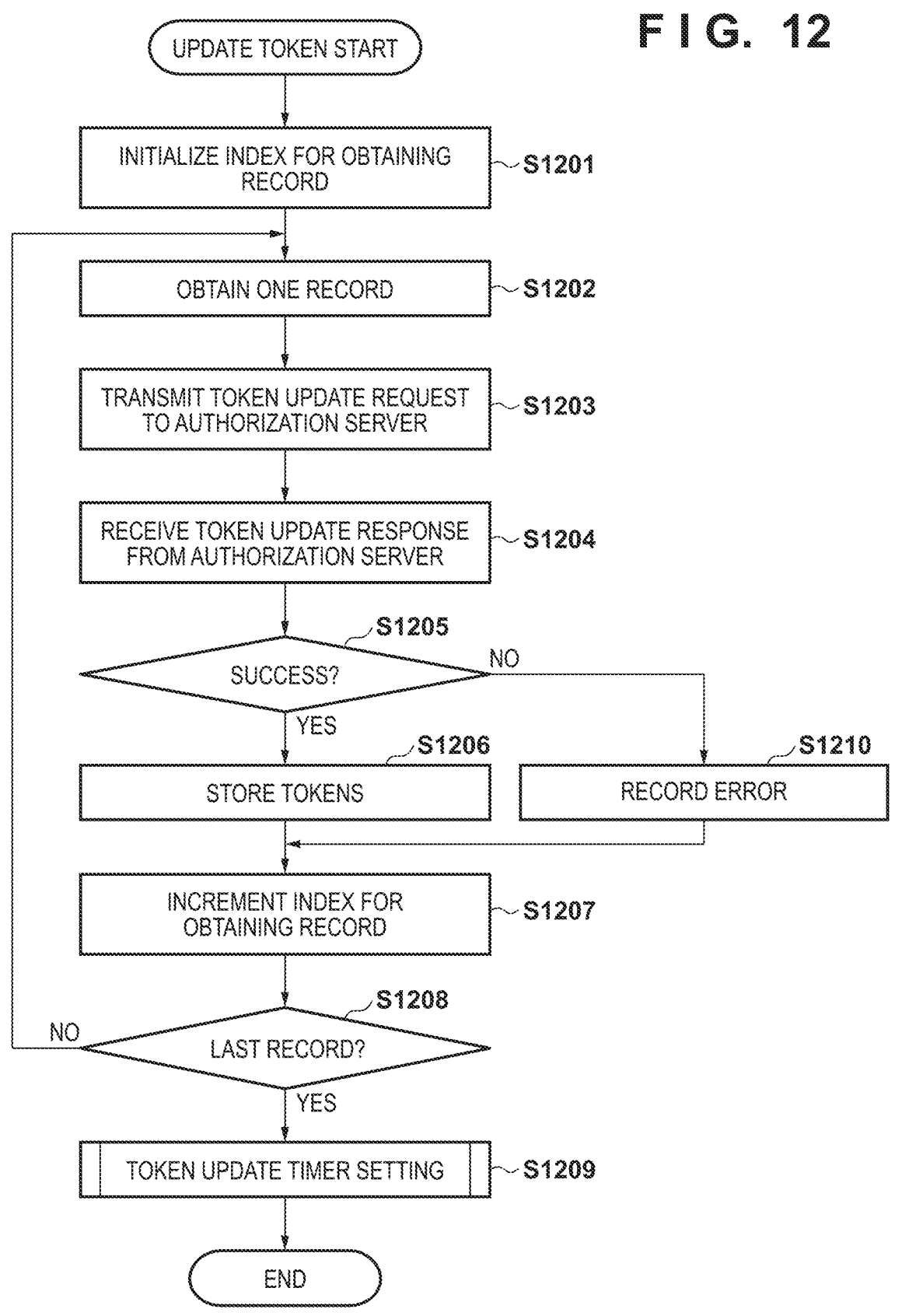
FIG. 12 is a flowchart in which the MFP updates a token.

FIG. 12 is a flowchart illustrating token update processing that is executed by the MFP 100. All the processing in the flowchart is realized by the CPU 201 executing a program of the token processing unit 511 of the MFP 100. When the token update timer is up (ends), processing in FIG. 12 is started. In step S1201, the index of a record to be extracted from the token management information 900 is initialized. An initial value may be 0, for example.

In step S1202, one record indicated by the index is extracted from the token management information 900.

In step S1203, a token update request is transmitted to an authorization server. Here, the authorization server that is a transmission destination is the authorization server 110 when the service-to-be-used 906 is the AAA corporation e-mail service, and is the authorization server 130 when the service-to-be-used 906 is the BBB corporation storage service. This processing is processing in step 701 in FIG. 7. The token update request includes a client ID and a refresh token for an access token that is to be updated.

In step S1204, a token update response is received from an authorization server. This corresponds to processing in step 702 in FIG. 7. In step S1205, it is determined as to whether or not the result of the token update response is successful, and the procedure advances to step S1206 if the result of the token update response is successful, and otherwise the procedure advances to step S1210.

In step S1206, the access token, the expiration time of the access token, the refresh token, and the expiration time of the refresh token included in the response received in step S1204 are stored in the token management information 900. Here, the record extracted in step S1202 is overwritten with such received information.

In step S1207, the index of a record to be extracted from the token management information 900 is updated, such that the next record can be extracted. It suffices for the index of each of all the stored records to be in focus one time, and thus an index in focus may be updated by adding one, for example. In step S1208, it is determined as to whether or not a processed record is the last record, and the procedure advances to step S1209 if the record is the last record, otherwise the procedure advances to step S1202.

Step S1209 corresponds to token update timer setting processing, which is processing described with reference to the flowchart in FIG. 11. When the processing ends, this flowchart is ended.

On the other hand, if it is determined in step S1205 that the result of a token update response is not successful, the occurrence of an error is stored in the FlashROM 210 as a processing record in step S1210. Output for notifying the operator of the error may be performed based on this record.

As described above, when the token update timer ends, all of the access tokens that are valid at this point are updated. In other words, when at least one of the expiration times of the obtained valid access tokens is reached, all of the obtained valid access tokens are updated. Accordingly, all of the tokens can be updated at one time (collectively). Accordingly, while updating the access tokens without invalidating the access tokens, it is possible to suppress (or prevent) the intermittent occurrence of update processing. For this reason, it is possible to reduce the number of occasions in which an operation in the power-saving mode stops due to update of a token, and to prevent an operation time in the power-saving mode from being shortened.

Note that, every time a token is updated, the token update timer is reset. Accordingly, the earliest update timing among the update timings of obtained valid tokens and a time until the earliest timing are set in the timer.

Power-saving Control

Here, power-saving control will be described. FIG. 13 is a state transition diagram illustrating driving states of the MFP 100. The MFP 100 has a power OFF state 1301, a normal mode 1302, and a power-saving mode 1303, and be in one of the state. When the power source is off, the state of the MFP 100 is in the power OFF state 1301. The normal mode 1302 is a state where the devices provided in the MFP 100 are energized. The power-saving mode 1303 is a state where power supply to the printer unit 103 and the scanner unit 104 is stopped, and power is supplied only to the operating unit 102 and a portion of the controller unit 101. In the power-saving mode, power is supplied to only limited portions of the MFP 100, and thus, compared with the normal mode, the power consumption amount can be reduced significantly.

When the MFP 100 is in the power OFF state 1301, and a power source SW (switch) of the power source unit 212 is turned ON, the mode of the MFP 100 changes to the normal mode 1302 (1304).

In the normal mode 1302, when the power source SW of the power source unit 212 is turned off, the state changes to the power OFF state 1301 (1305).

When a power-saving mode transition condition is met while the MFP 100 is in the normal mode 1302, the mode changes to the power-saving mode 1303 (1307). Here, the power-saving mode transition condition may include a certain period of time having elapsed since when an operation was lastly performed on the operating unit 102, a certain period of time having elapsed since when the printer unit 103 ended printing, and the like. Moreover, the condition may include a certain period of time having elapsed since when the scanner unit 104 ended scanning, a certain period of time having elapsed since when token update processing ended, a certain period of time having elapsed since when communication performed via the network I/F 204 was ended, and the like. In addition, the condition may include the operating unit 102 having given an instruction to change the mode to the power-saving mode.

When the power source SW of the power source unit 212 is turned off while the MFP 100 is in the power-saving mode 1303, the state changes to the power OFF state 1301 (1306). When a normal mode transition condition is met while the MFP 100 is in the power-saving mode 1303, the mode changes to the normal mode (1308).

Here, the condition for transition to the normal mode includes an operation having been performed on the operating unit 102, and a function, which is publicized by the MFP 100 via a network, having been accessed by the client terminal 150 via the network I/F 204 to make a print request or the like. Furthermore, the condition also includes an execution time of processing set in the timer control unit 512 having been reached, or the like. Processing that is started at a time set in the timer control unit 512 includes token update processing in FIG. 12.

In addition, registration of processing that is executed when the mode changes from the power-saving mode to the normal mode is accepted. When this processing is registered, this registered processing is executed when the mode changes from the power-saving mode 1303 to the normal mode 1302 (1308). An overview of power-saving control is given above.

Effects

Next, effects of reducing power consumption according to the embodiment of the present disclosure will be described. FIG. 14 is a time chart diagram illustrating 60-minute simulation of a conventional case where token update processing is performed at a timing when the expiration time of each access token is reached.

Here, a condition for transition to the power-saving mode is set to one minute having elapsed since when token update processing was ended, the effective period of an access token of the AAA corporation e-mail service being 20 minutes, and the effective period of an access token of the BBB corporation storage service being 30 minutes. The blank rectangular portions in the figure indicate periods during which the MFP 100 is operating in the normal mode, and the hatched rectangular portions indicate periods during which the MFP 100 is operating in the power-saving mode.

First, assume that the access tokens of the AAA corporation e-mail service and BBB corporation storage service are updated in the beginning of a normal mode period 1401. Processing for updating the access tokens ends in a short time, and thus this processing may be ignored when simulation is performed by minute. Therefore, the MFP 100 operates in the normal mode for one minute after the two access tokens have been updated. After that, when the power-saving mode transition condition is satisfied, the mode changes to the power-saving mode, and the MFP 100 operates in the power-saving mode (also referred to as a "sleep mode") for 19 minutes, which is a power-saving mode period 1402.

Next, the mode changes to the normal mode after 20 minutes from the previous update of the AAA corporation e-mail service, that is to say at the expiration time of the AAA corporation e-mail service, the access token of the AAA corporation e-mail service is updated, and, during a normal mode period 1403, the MFP 100 operates in the normal mode for one minute. After that, the mode changes to the power-saving mode, and, during a power-saving mode period 1404, the MFP 100 operates in the power-saving mode for nine minutes.

Next, the mode changes to the normal mode after 30 minutes from the previous update of the BBB corporation storage service, that is to say at the expiration time of the BBB corporation storage service, the access token of the BBB corporation storage service is updated, and, during a normal mode period 1405, the MFP 100 operates in the normal mode for one minute. After that, the mode changes to the power-saving mode, and, during a power-saving mode period 1406, the MFP 100 operates in the power-saving mode for nine minutes.

Next, the mode changes to the normal mode after 20 minutes from the previous update of the AAA corporation e-mail service, that is to say at the expiration time of the AAA corporation e-mail service, the access token of the AAA corporation e-mail service is updated, and, during a normal mode period 1407, the MFP 100 operates in the normal mode for one minute. After that, the mode changes to the power-saving mode, and, during a power-saving mode period 1408, the MFP 100 operates in the minute power-saving mode for 19 minutes. To this point, 60 minutes has elapsed from the start.

In this simulation, the MFP 100 operates in the normal mode for four minutes out of the 60 minutes.

FIG. 15 is a time chart diagram illustrating 60-minute simulation in a case where all the token update processing is performed at the timing of the shortest period from among the expiration times of access tokens according to the disclosure of the present embodiment.

Here, similarly to FIG. 14, a condition for transition to the power-saving mode is set to one minute having elapsed since when token update processing was ended, the effective period of the access token of the AAA corporation e-mail service being 20 minutes, and the effective period of the access token of the BBB corporation storage service being 30 minutes. The blank rectangular portions in the figure indicate periods during which the MFP 100 is operating in the normal mode, and the hatched rectangular portions indicate periods during which the MFP 100 is operating in the power-saving mode.

First, assume that the access tokens of the AAA corporation e-mail service and the BBB corporation e-mail service are updated in the beginning of a normal mode period 1501. The MFP 100 then operates in the normal mode about one minute. After that, when the power-saving mode transition condition is satisfied, the mode changes to the power-saving mode, and the MFP 100 operates in the power-saving mode for 19 minutes, which is a power-saving mode period 1502.

Next, the mode changes to the normal mode after 20 minutes from the previous update, that is to say at the expiration time of the AAA corporation e-mail service, and the access token of the AAA corporation e-mail service and the access token of the BBB corporation storage service are updated. After that, during a normal mode period 1503, the MFP 100 operates in the normal mode for one minute. The mode then changes to the power-saving mode, and, during a power-saving mode period 1504, the MFP 100 operates in the power-saving mode for 19 minutes.

Next, after 20 minutes from the previous update, that is to say at the expiration time of the AAA corporation e-mail service, the mode changes to the normal mode, and the access token of the AAA corporation e-mail service and the access token of the BBB corporation storage service are updated. After that, during a normal mode period 1505, the MFP 100 operates in the normal mode for one minute. The mode then changes to the power-saving mode, and, during a power-saving mode period 1506, the MFP 100 operates in the power-saving mode for 19 minutes. To this point, 60 minutes has elapsed from the start.

In this simulation, the MFP 100 operates in the normal mode for three minutes out of the 60 minutes. Compared with simulation in which tokens are updated at a conventional timing in FIG. 14, the operation time in the normal mode in simulation according to the embodiment of the present disclosure is shorter by one minute. With this simulation, an effect of one minute out of 60 minutes is achieved, but the effect is improved when a time for transition to the power-saving mode is long, or the number of held access tokens is large. Therefore, according to the present embodiment, by updating all of the access tokens at the interval of the shortest expiration time among the expiration times of a plurality of access tokens, it is possible to increase the operation time in the power-saving mode.

Variations

In the sequence in FIG. 6, the MFP 100 that has received the device authorization response in step 603 may display, on the operating unit 102, a screen that includes a two-dimensional barcode and a user code obtained by encoding the URL of an end user verification end point for performing user code approval, for example. In that case, instead of transmitting a device authorization result screen to the client terminal 150 in step 604, the client terminal 150 reads the two-dimensional barcode displayed on the MFP 100. The two-dimensional barcode is then decoded to obtain the URL of the end user verification end point, and the URL may be accessed in step 607.

In addition, in FIG. 6, although a user code and authentication information are authenticated in independent processes on independent screens, the authorization server 110 may transmit an input screen for both a user code and authentication information to the client terminal 150, in step 608. In that case, the client terminal may receive both the user code and authentication information on the one screen and transmit them to the authorization server 110, to perform user authentication.

Note that, for example, the authorization server 110 issues a device code for specifying the MFP 100, in association with the user code, and transmits the device code to the client terminal 150 via the MFP 100. The client terminal 150 then transmits the device code along with the input user code to the authorization server 110 in step 609, and thereby the reliability of the user can be further increased.

Second Embodiment

In the first embodiment, an example has been illustrated in which token update processing in FIG. 12 is started when the token update timer is up. An example will be described in which token update processing is performed not only when a token update time comes, but also when the mode changes from the power-saving mode to the normal mode.

In the present embodiment, in place of the flowchart in FIG. 10 in the first embodiment, processing to be described with reference to the flowchart in FIG. 22 is performed. All of the processing in the flowchart is realized by the CPU 201 executing a program of the token processing unit 511 of the MFP 100. Processing of steps S1001 to S1009 is the same as FIG. 10.

Step S2201 is performed after step S1008 and after step S1010. In step S2201, token update processing (FIG. 12) is registered as processing that is executed when the mode is changed from the power-saving mode to the normal mode by the power-saving control unit 510 (1308).

Accordingly, when the mode is changed from the power-saving mode to the normal mode by the power-saving control unit 510 (1308), token update processing (FIG. 12) is executed.

Power-saving effects according to the present embodiment will be described.

FIG. 18 is a time chart diagram illustrating simulation in a case where all the token update processing is performed at the timing of the shortest period among the expiration times of access tokens, and when the mode changes from the power-saving mode to the normal mode (1308) according to the present embodiment. The simulation time is 60 minutes.

Here, similarly to FIG. 14, a condition for transition to the power-saving mode is one minute having elapsed since when token update processing was ended, the effective period of the access token of the AAA corporation e-mail service being 20 minutes, and the effective period of the access token of the BBB corporation storage service being 30 minutes. In FIG. 14, the blank rectangular portions indicate periods during which the MFP 100 is operating in the normal mode, and the hatched rectangular portions indicate periods during which the MFP 100 is operating in the power-saving mode.

First, assume that, in the beginning of a normal mode period 1801, the access tokens of the AAA corporation e-mail service and BBB corporation e-mail service are updated. The MFP 100 then operates in the normal mode for about one minute. After that, the mode changes to the power-saving mode, and, during a power-saving mode period 1802, the MFP 100 operates in the power-saving mode for five minutes.

Here, assume that the user performs an operation on the operating unit 102 of the MFP 100 to execute a copy function, and ends processing in about two minutes. At this time, due to the user operation, the mode of the MFP 100 changes from the power-saving mode to the normal mode, and thus token update processing is executed, and the access token of the AAA corporation e-mail service and the access token of the BBB corporation storage service are updated. After one minute since when processing ended, the mode changes to the power-saving mode, and thus, here, during a normal mode period 1803, the MFP 100 operates in normal mode for three minutes. After that, the mode changes to the power-saving mode, and, during a power-saving mode period 1804, the MFP 100 operates in the power-saving mode for 19 minutes.

Next, after 20 minutes from the previous update, that is to say at the expiration time of the AAA corporation e-mail service, the mode changes to the normal mode, and the access token of the AAA corporation e-mail service and the access token of the BBB corporation storage service are updated. Then, at this time, during a normal mode period 1805, the MFP 100 operates in the normal mode for one minute. After that, the mode changes to the power-saving mode, and, during a power-saving mode period 1806, the MFP 100 operates in the power-saving mode for 19 minutes.

Next, after 20 minutes from the previous update, namely at the expiration time of the AAA corporation e-mail service, the mode changes to the normal mode, and the access token of the AAA corporation e-mail service and the access token of the BBB corporation storage service are updated. Then, at this time, during a normal mode period 1807, the MFP 100 operates in the normal mode for one minute. The mode then changes to the power-saving mode, and, during a power-saving mode period 1808, the MFP 100 operates in the power-saving mode for 14 minutes. To this point, 60 minutes has elapsed from the start.

In this simulation, the MFP 100 operates in the normal mode for six minutes out of the 60 minutes. Note that, out of the six minutes, a period during which the user uses the copy function (a normal mode period 1803) is three minutes, and an operation time in the normal mode only for updating the access tokens is substantially three minutes. Compared with the simulation in FIG. 14, an operation time in the normal mode is shorter by one minute. With this simulation, an effect of one minute out of 60 minutes is achieved, but the effect is improved when a time for transition to the power-saving mode is long, or the number of held access tokens is large.

According to the present embodiment, all of the access tokens are updated at the time interval of the shortest expiration time among the expiration times of a plurality of access token, and when the mode changes from the power-saving mode to the normal mode. With such a configuration, it is possible to increase an operation time in the power-saving mode.

Third Embodiment

In the first and second embodiments, examples have been illustrated in which all of the access tokens are unconditionally updated in token update processing (FIG. 12). In the present embodiment, an example will be illustrated in which only an access token, for which an expiration time will be reached until the next timing for performing update processing, is updated.

In the present embodiment, in place of the flowchart in FIG. 12 according to the first embodiment, processing to be described with reference to the flowchart in FIG. 23 is executed. All the processing in this flowchart is realized by the CPU 201 executing a program of the token processing unit 511 of the MFP 100.

Processing of steps S1201 to S1210 is the same as that in FIG. 12.

In step 2301, it is determined whether or not the expiration time of the access token of a record that is currently a processing target is later than or equal to the next token update processing time. The next token update processing time takes a value obtained by adding the current time to an execution timer interval stored in the FlashROM 210 in step S1102. If the expiration time of the token of interest is later than or equal to the next token update processing time, token update processing is skipped, and the procedure advances to step S1207, otherwise the procedure advances to step S1203.

A case will be described in which, for example, token management information is in the state of token management information 1900 illustrated in FIG. 19, and token update processing is executed on the access token 1111aaaa at Dec. 15, 2022 13:20:00. Here, the execution timer interval is 20 minutes, and thus the next token update processing time is Dec. 15, 2022 13:40:00.

The expiration time of the access token 1111aaaa of the AAA corporation e-mail service is Dec. 15, 2022 13:20:00, and thus, it is determined in step S2301 that it is not later than or equal to the next token update processing time. In addition, the expiration time of an access token 3333aaaa of the BBB corporation storage service is Dec. 15, 2022 13:50:00, and thus, it is determined in step S2301 that it is later than or equal to the next token update processing time. For this reason, in token update on Dec. 15, 2022 13:20:00, the access token 1111aaaa is updated, while the access token 3333aaaa is not updated.

As described above, in the present embodiment, a token that only needs to be updated at the next timing or later is not updated at the current token update timing, and thereby it is possible to suppress the power consumption amount during token update. In addition, the effect of the first embodiment is not lost in the present embodiment.

Furthermore, in the second embodiment, token update processing that is executed when the mode returns from the power-saving mode to the normal mode may be processing in FIG. 12 or processing in FIG. 23 of the present embodiment. With such a configuration, without losing the effect of the second embodiment, it is possible to suppress the power consumption amount during token update.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) TM), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-108517, filed Jun. 30, 2023 which is hereby incorporated by reference herein in its entirety.

What is claimed is:

1. An information processing apparatus that communicates with an authorization server, and that has a power-saving function for changing a mode of the information processing apparatus from a normal mode to a power-saving mode in which a power consumption amount is smaller, when a predetermined condition is satisfied, the information processing apparatus comprising:

at least one memory storing instructions; and at least one processor that, upon execution of the stored instructions, is configured to perform operations including;

obtaining an access token and an expiration time of the access token from the authorization server via communication, storing an expiration time of the obtained access token and the access token in association with each other, and determining, by the processor, the information processing apparatus is in the power-saving mode, determining, by the processor, an expiration time of at least one access token out of obtained and stored access tokens is reached, and in response to determining the information processing apparatus is in the power-saving mode and determining the expiration time of the at least one access token out of the obtained and stored access tokens is reached, returning, by the processor, the information processing apparatus to the normal mode and updating, by the processor, all of the obtained and stored access tokens.

2. The information processing apparatus according to claim 1, further comprising:

a timer for measuring a set time, wherein execution of the stored instructions further configures the at least one processor to perform operations including:

setting, when the access token is obtained or updated, the timer to include a time based on an earliest expiration time among expiration times of the obtained and stored access tokens, when an access token is obtained or updated, and updating at least some of the obtained access tokens when a time measured by the timer reaches the set time.

3. The information processing apparatus according to claim 2, wherein execution of the stored instructions further configures the at least one processor to perform operations including: updating an access token, from among the obtained access tokens, whose expiration time is earlier than a next update timing when the expiration time of at least one access token from among the obtained and stored access tokens is reached.

4. The information processing apparatus according to claim 3, wherein the next update timing is a timing when the time set in the timer has elapsed from the expiration time.

5. The information processing apparatus according to claim 1, wherein execution of the stored instructions further configures the at least one processor to perform operations including executing update processing for updating all of the obtained access tokens when the mode of the information processing apparatus changes from the power-saving mode to the normal mode.

6. The information processing apparatus according to claim 5, wherein execution of the stored instructions further configures the at least one processor to perform operations including:

executing setting processing when the mode of the information processing apparatus changes from the power-saving mode to the normal mode, wherein, by setting the update processing as processing that is executed when the mode of the information processing apparatus changes from the power-saving mode to the normal mode, all of the obtained access tokens are updated when the mode of the information processing apparatus changes from the power-saving mode to the normal mode.

7. The information processing apparatus according to claim 1, wherein the access token is updated by transmitting a refresh token obtained along with the access token, to the authorization server.

8. The information processing apparatus according to claim 1, wherein the access token is issued by the authorization server when transfer of a user authority is approved by a user.

9. A non-transitory computer-readable storage medium storing a program which, when executed, causes a computer of an information processing apparatus to execute a process, wherein the computer communicating with an authorization server, and has a power-saving function for changing a mode of the computer from a normal mode to a power-saving mode in which a power consumption amount is smaller, when a predetermined condition is satisfied, and the process comprises:

obtaining an access token and an expiration time of the access token from the authorization server via a communication, storing an expiration time of an obtained access token and the access token in association with each other, and determining, by the processor, the information processing apparatus is in the power-saving mode, determining, by the processor, an expiration time of at least one access token out of obtained and stored access tokens is reached, and in response to determining the information processing apparatus is in the power-saving mode and determining the expiration time of the at least one access token out of the obtained and stored access tokens is reached, returning, by the processor, the information processing apparatus to the normal mode and updating, by the processor, all of the obtained and stored access tokens.

10. A control method that is performed by an information processing apparatus that has a power-saving function for changing a mode of the information processing apparatus from a normal mode to a power-saving mode in which a power consumption amount is smaller, when a predetermined condition is satisfied, the information processing apparatus communicating with an authorization server, the control method comprising:

obtaining, by a processor, an access token and an expiration time of the access token from the authorization server via a communication, storing, by the processor, an expiration time of an obtained access token and the access token in association with each other, and, determining, by the processor, the information processing apparatus is in the power- saving mode, determining, by the processor, an expiration time of at least one access token out of obtained and stored access tokens is reached, and in response to determining the information processing apparatus is in the power- saving mode and determining the expiration time of the at least one access token out of the obtained and stored access tokens is reached, returning, by the processor, the information processing apparatus to the normal mode and updating, by the processor, all of the obtained and stored access tokens.

* * * * *